(12) United States Patent
Ichida et al.

(10) Patent No.: US 10,889,352 B2
(45) Date of Patent: Jan. 12, 2021

(54) BICYCLE CONTROL APPARATUS AND BICYCLE DRIVING DEVICE EQUIPPED WITH A CONTROL APPARATUS

(71) Applicant: Shimano Inc., Osaka (JP)

(72) Inventors: Tadashi Ichida, Osaka (JP); Hiroyuki Miyoshi, Osaka (JP); Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 198 days.

(21) Appl. No.: 16/105,466

(22) Filed: Aug. 20, 2018

(65) Prior Publication Data

US 2018/0354582 A1    Dec. 13, 2018

Related U.S. Application Data

(62) Division of application No. 15/228,710, filed on Aug. 4, 2016, now Pat. No. 10,081,409.

(30) Foreign Application Priority Data

Aug. 28, 2015 (JP) .................................. 2015-169581

(51) Int. Cl.
| | | |
|---|---|---|
| B62M 6/50 | (2010.01) | |
| B62M 6/45 | (2010.01) | |
| B62M 6/55 | (2010.01) | |
| B62K 25/00 | (2006.01) | |
| B62M 6/70 | (2010.01) | |
| B62M 6/90 | (2010.01) | |
| B62J 45/415 | (2020.01) | |

(52) U.S. Cl.
CPC ............... *B62M 6/50* (2013.01); *B62K 25/00* (2013.01); *B62M 6/45* (2013.01); *B62M 6/55* (2013.01); *B62M 6/70* (2013.01); *B62M 6/90* (2013.01); *B62J 45/4152* (2020.02); *B62K 2204/00* (2013.01)

(58) Field of Classification Search
CPC . B62M 6/50; B62M 6/45; B62M 6/55; B62M 6/70; B62M 6/90; B62K 25/00; B62K 2204/00; B62J 45/4152
See application file for complete search history.

(56) References Cited

U.S. PATENT DOCUMENTS

| | | |
|---|---|---|
| 5,320,336 A | 6/1994 | Asami |
| 5,825,665 A | 10/1998 | Swift et al. |
| 7,089,674 B1 | 8/2006 | Hendon |
| 2001/0030408 A1* | 10/2001 | Miyoshi ................ B62K 25/04 280/276 |
| 2002/0039951 A1 | 4/2002 | Hasegawa |
| 2005/0171659 A1 | 8/2005 | Okazaki |

(Continued)

FOREIGN PATENT DOCUMENTS

| | | |
|---|---|---|
| CN | 102219042 A | 10/2011 |
| CN | 103434604 A | 12/2013 |

(Continued)

*Primary Examiner* — Calvin Cheung
(74) *Attorney, Agent, or Firm* — Global IP Counselors, LLP

(57) ABSTRACT

A bicycle control apparatus is provided that can improve the stability of the behavior of a bicycle. The bicycle control apparatus includes a controller configured to control a motor that assists a manual drive force, based on a state of a suspension that absorbs vibrations of a bicycle.

16 Claims, 16 Drawing Sheets

(56) References Cited

U.S. PATENT DOCUMENTS

| | | | |
|---|---|---|---|
| 2009/0216415 A1 | 8/2009 | Iwatsuki et al. | |
| 2011/0160973 A1 | 6/2011 | Matsuda | |
| 2012/0065825 A1 | 3/2012 | Nicoson | |
| 2013/0267376 A1 | 10/2013 | Takachi | |
| 2014/0035256 A1* | 2/2014 | Zubieta Andueza | B62K 25/286 280/284 |
| 2014/0324261 A1 | 10/2014 | Amano | |
| 2015/0197308 A1* | 7/2015 | Butora | B62K 25/08 280/283 |
| 2015/0292934 A1* | 10/2015 | Baumgaertner | G01G 19/02 701/22 |
| 2016/0039496 A1* | 2/2016 | Hancock | B60W 10/08 701/60 |
| 2016/0304157 A1 | 10/2016 | Craven et al. | |
| 2017/0334514 A1* | 11/2017 | Chen | B62M 6/55 |

FOREIGN PATENT DOCUMENTS

| | | |
|---|---|---|
| CN | 104044689 A | 9/2014 |
| DE | 10 2010 018 138 A1 | 10/2011 |
| EP | 2 377 713 A1 | 10/2011 |
| JP | H6-107266 A | 4/1994 |
| JP | H9-123979 A | 5/1997 |
| JP | 2000-247282 A | 9/2000 |
| JP | 2002-19685 A | 1/2002 |
| JP | 2002-70709 A | 3/2002 |
| JP | 2010-229912 A | 10/2010 |
| JP | 2011-137416 A | 7/2011 |
| JP | 2013-216176 A | 10/2013 |
| WO | 2013/069300 A1 | 5/2013 |
| WO | 2015/027540 A1 | 3/2015 |

* cited by examiner

BICYCLE CONTROL APPARATUS AND BICYCLE DRIVING DEVICE EQUIPPED WITH A CONTROL APPARATUS

CROSS-REFERENCE TO RELATED APPLICATIONS

This application is a divisional application of U.S. patent application Ser. No. 15/228,710, filed on Aug. 4, 2016, which claims priority to Japanese Patent Application No. 2015-169581, filed on Aug. 28, 2015. The entire disclosure of U.S. patent application Ser. No. 15/228,710 is hereby incorporated herein by reference.

BACKGROUND

Field of the Invention

The present invention relates to a bicycle control apparatus and a bicycle driving device equipped with a control apparatus.

Background Information

Conventionally, a bicycle driving device is known that comprises a bicycle control apparatus and a motor, which assists a manual drive force. For example, a bicycle driving device is disclosed in Japanese Laid-Open Patent Publication No, Hei 6-107266) that has a bicycle control apparatus and a motor, which assists a manual drive force.

SUMMARY

It has been discovered that there are times in which a front wheel or a rear wheel of a bicycle is lifted up from the road or ground due to a front wheel or a rear wheel coming in contact with irregularities of a road surface, the ground or the like. At this time of the wheel losing contact with the road or ground, a bicycle equipped with an above-described bicycle driving device will have an odd behavior as a result of the driving torque of the motor.

An object of the present invention is to provide a bicycle control apparatus that can improve the stability of the behavior of a bicycle, and a bicycle driving device equipped with the control apparatus. The bicycle control apparatus includes a controller configured to control a motor that assists a manual drive force, based on a state of a suspension that absorbs vibrations of a bicycle.

The bicycle control apparatus and the bicycle driving device equipped with a control apparatus of the present invention are capable of improving the stability of the behavior of a bicycle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
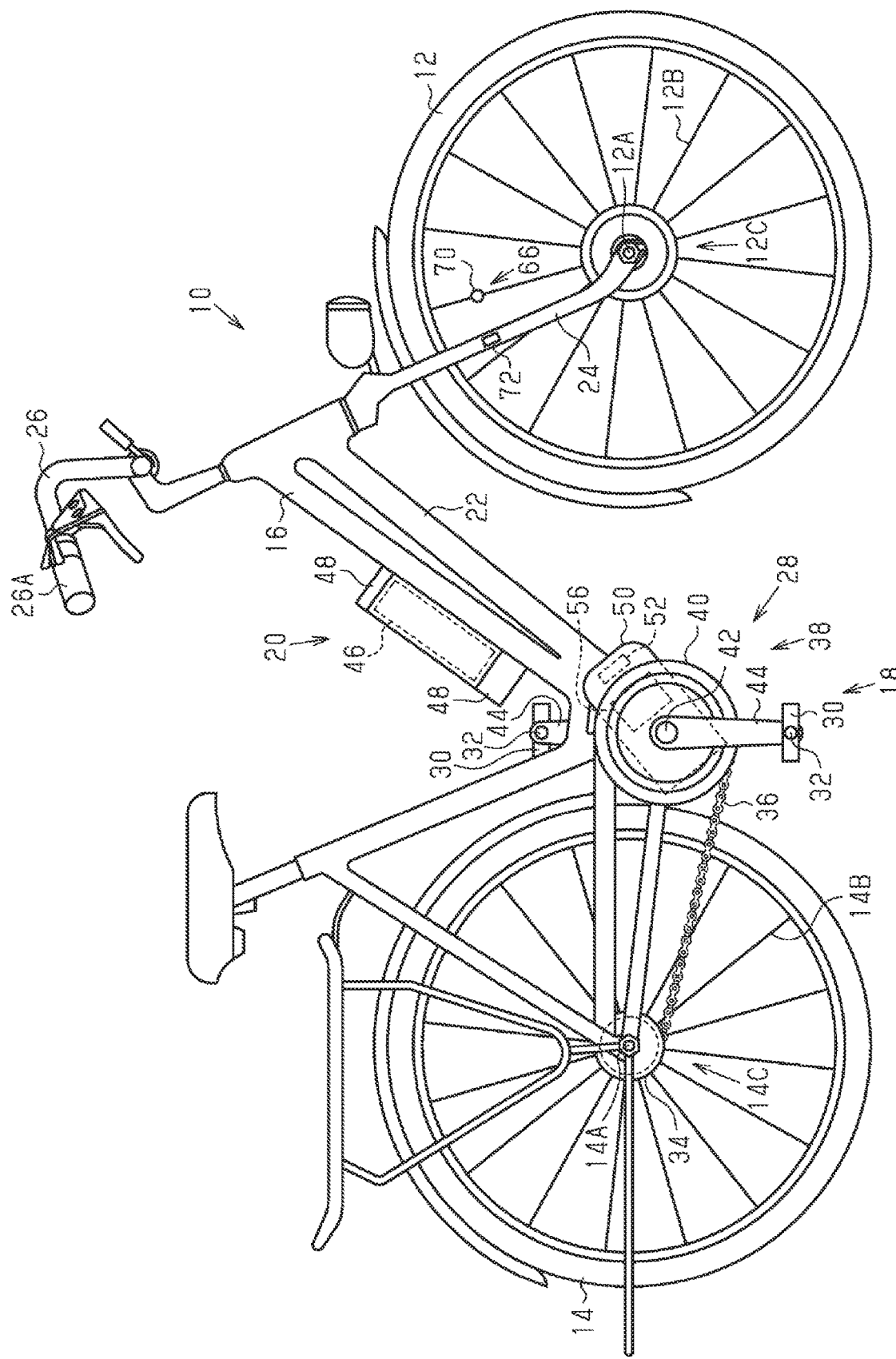
FIG. 1 is a side elevational view of a bicycle equipped with a bicycle control apparatus in accordance with a first embodiment.

The configuration of a bicycle equipped with a bicycle driving device of the first embodiment will be described, with reference to FIGS. 1 to 4. As shown in FIG. 1, a bicycle 10 comprises a front wheel 12, a rear wheel 14, a bicycle body 16, a drive mechanism 18, a battery unit 20 and a bicycle driving device 50. The bicycle body 16 comprises a frame 22, a front fork 24 which is connected to the frame 22, and a handlebar 26A which is detachably connected to the front fork 24 via a stem 26. The front fork 24 is supported to the frame 22 and connected to an axle 12A of the front wheel 12.

The drive mechanism 18 comprises a crank assembly 28, a pair of (left and right) pedals 30, a pair of pedal shafts 32, a rear sprocket 34, and a chain 36. The crank assembly 28 comprises a crank 38 and a front sprocket 40. The crank 38 comprises a crankshaft 42 that is rotatably supported to the frame 22 and a pair of (left and right) crank arms 44. The left and right crank arms 44 are attached to the crankshaft 42. The left and right pedals 30 are attached to the crank arms 44 so as to be rotatable around the pedal shafts 32.

The front sprocket 40 is connected to the crankshaft 42. The front sprocket 40 is provided coaxially with the crankshaft 42. The front sprocket 40 can be coupled so as to not rotate relatively with the crankshaft 42, or be coupled via a one-way clutch (not shown) so that the front sprocket 40 will also roll forward when the crankshaft 42 rolls forward.

The rear sprocket 34 is rotatably attached to the rear wheel 14 around an axle 14A of the rear wheel 14. The rear sprocket 34 is coupled with the rear wheel 14 via a one-way clutch (not shown). The chain 36 is wound to the front sprocket 40 and the rear sprocket 34. When the crankshaft 42 is rotated by manual drive force that is applied to the pedals 30, the rear wheel 14 is rotated by the front sprocket 40, the chain 36 and the rear sprocket 34.

The battery unit 20 comprises a battery 46 and a battery holder 48 for detachably attaching the battery 46 to the frame 22. The battery 46 includes one or a plurality of battery cells. The battery 46 is formed of a rechargeable battery. The battery 46 is electrically connected to a motor 56 of the bicycle driving device 50 and supplies electric power to the motor 56.

Figure 2:
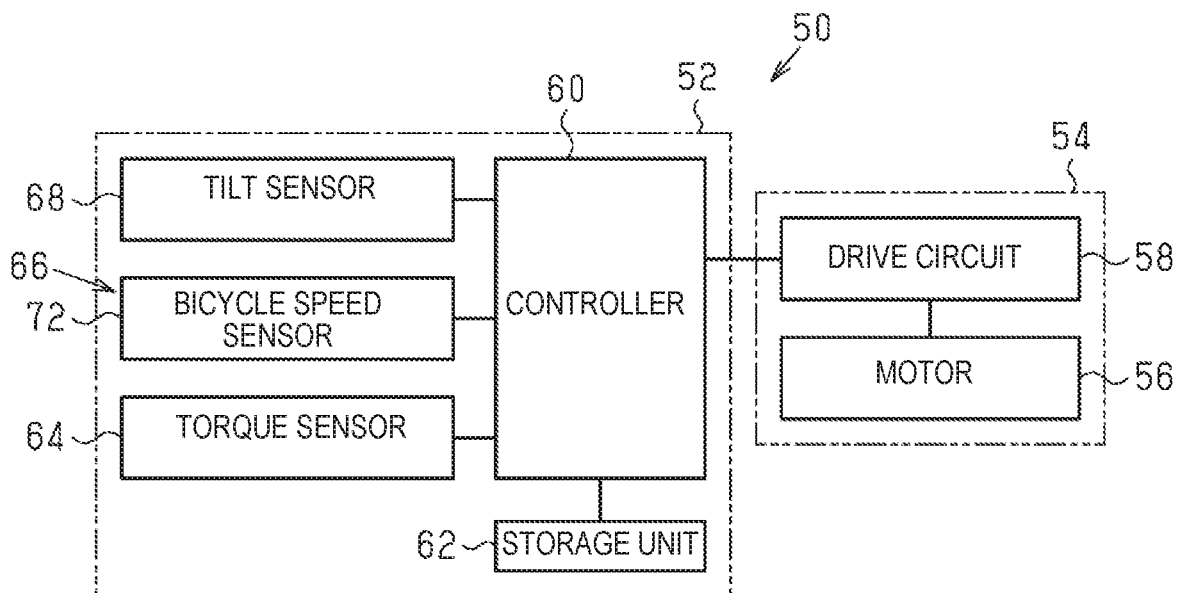
FIG. 2 is a block diagram of a bicycle driving device including the bicycle control apparatus having a controller in accordance with the first embodiment.

As shown in FIG. 2, the bicycle driving device 50 comprises a bicycle control apparatus 52. Preferably, the bicycle driving device 50 comprises an assist mechanism 54 which includes the motor 56. The assist mechanism 54 comprises the motor 56 which assists the manual drive force that is inputted to the bicycle 10 (refer to FIG. 1), and a drive circuit 58 for controlling the motor 56.

The assist mechanism 54 shown in FIG. 1 is provided in the vicinity of the crank assembly 28. The motor 56 is an electric motor. The output shaft of the motor 56 is coupled to a transmitting member (not shown) that transmits the manual drive force between the crankshaft 42 and the front sprocket 40. Meanwhile, it is also possible to couple the motor 56 to the crankshaft 42 or the front sprocket 40. A one-way clutch (not shown) for preventing the motor 56 from being rotated by the manual drive force when a crank arm 44 rolls forward can be provided between the motor 56 and the front sprocket 40. The motor 56 is provided so as to be capable of transmitting drive force to a drive path between the crankshaft 42 and the front sprocket 40. It is not necessary for an output shaft of the motor 56 and the drive path to be directly connected. For example, it is also possible to provide a decelerator between the output shaft of the motor 56 and the drive path, in order to decelerate rotation of the motor 56 and to transmit the same to the drive path.

As shown in FIG. 2, the bicycle control apparatus 52 comprises a controller 60. Preferably, the bicycle control apparatus 52 comprises a storage unit 62, a torque sensor 64, a bicycle speed detection device 66 and a tilt sensor 68. The torque sensor 64 detects the manual drive force that is applied to the crank 38 (refer to FIG. 1). The torque sensor 64 outputs a signal corresponding to the manual drive force. The torque sensor 64 can be provided to a drive path between the crankshaft 42 shown in FIG. 1 to the front sprocket 40, provided to the crankshaft 42 or the front sprocket 40, or provided to the crank arms 44 or the pedals 30. The torque sensor 64 can be realized by using, for example, a strain sensor, a magnetostrictive sensor, an optical sensor, or a pressure sensor, and any sensor that outputs a signal corresponding to the manual force that is applied to the crank 38 or the pedals 30 can be employed.

The bicycle speed detection device 66 comprises a magnet 70 and a bicycle speed sensor 72. The bicycle speed sensor 72 outputs a signal which reflects the rotational speed of the front wheel 12. The bicycle speed sensor 72 is fixed to the front fork 24 by a bolt and nut, or a band, etc. The magnet 70 is attached to spokes 12B of the front wheel 12. The bicycle speed sensor 72 is capable of detecting the magnet 70 that is provided to the front wheel 12. The bicycle speed sensor 72 is electrically connected to the controller 60 by a cable (not shown). The bicycle speed sensor 72 outputs a signal corresponding to the rotation speed of the front wheel 12, that is, the bicycle speed of the bicycle 10, to the controller 60 each time the front wheel 12 is rotated 360 degrees. The bicycle speed detection device 66 can be provided to the rear wheel 14 as well. In this case, the magnet 70 is attached to the spokes 14B of the rear wheel 14. The bicycle speed sensor 72 is capable of detecting the magnet 70 that is provided to the rear wheel 14.

The tilt sensor 68 is provided to the bicycle body 16 (refer to FIG. 1). The tilt sensor 68 can be provided to the frame 22, or, can be provided to a housing of the assist mechanism 54. The tilt sensor 68 includes a gyro sensor (not shown). The tilt sensor 68 detects the pitch angle $\theta$ of the bicycle body 16 of the bicycle 10. For example, the tilt sensor 68 is capable of detecting at least the angular velocity of the pitch angle $\theta$. The tilt sensor 68 outputs a value obtained by integrating the angular velocity around the pitch axis to the controller 60 as the pitch angle $\theta$. The pitch angle $\theta$ is the rotational angle around a prescribed pitch axis that extends in the lateral direction of the bicycle 10. The pitch angle $\theta$ is set so as to be "zero" degrees in a state in which the bicycle 10 is placed on level ground. That is, the front end of a bicycle 16 is positioned further upward than the rear end, as the pitch angle θ is increased greater than "zero" degrees. On the other hand, the front end of a bicycle 16 is positioned further downward than the rear end, as the pitch angle θ is decreased less than "zero" degrees. Meanwhile, the lateral direction of the bicycle 10 is equal to the lateral direction of a rider when a rider mounts the bicycle 10. It is possible for the tilt sensor 68 to further include an acceleration sensor, and to correct the pitch angle θ by using the detected value of the acceleration sensor.

The controller 60 is provided to a housing of the assist mechanism 54. The controller 60 drives the motor 56 according to at least one of the manual drive force that is detected by the torque sensor 64 and the bicycle speed that is detected by the bicycle speed sensor 72. A map that defines the relationship between the output of the motor 56 and the manual drive force as well as the bicycle speed (hereinafter referred to as "output map"), or, a calculation program that calculates the output torque of the motor 56 by using a calculation formula and the manual drive force as well as the bicycle speed, is stored in the storage unit 62. The controller 60 outputs a signal based on the output map or the calculation program to the drive circuit 58. The controller 60 comprises a calculation processing device that executes a predetermined control program, and memory in which the predetermined control program is stored. The calculation processing device includes, for example, a CPU (Central Processing Unit) or an MPU (Micro Processing Unit) that includes a one or more processors. Software is stored in the storage unit 62. The storage unit 62 is preferably any memory device (i.e., a non-transitory computer readable medium such as a ROM (Read Only Memory) device, hard disk, etc.). The controller 60 executes software that is stored in the storage unit 62 to achieve a plurality of functions of the control apparatus 52. The control apparatus 52 can comprise a plurality of calculation processing devices, and comprise a plurality of microcomputers.

There are cases in which the front wheel 12 of the bicycle 10 is lifted up off of the road or ground by coming in contact with irregularities of the road surface or the like. The controller 60 detects an uplift of the front wheel 12 by using the tilt sensor 68 and executes a control of the motor 56 that is suitable for the uplift of the front wheel 12. That is, the controller 60 executes a torque control process for controlling the motor 56 based on the output of the tilt sensor 68.

Figure 3:
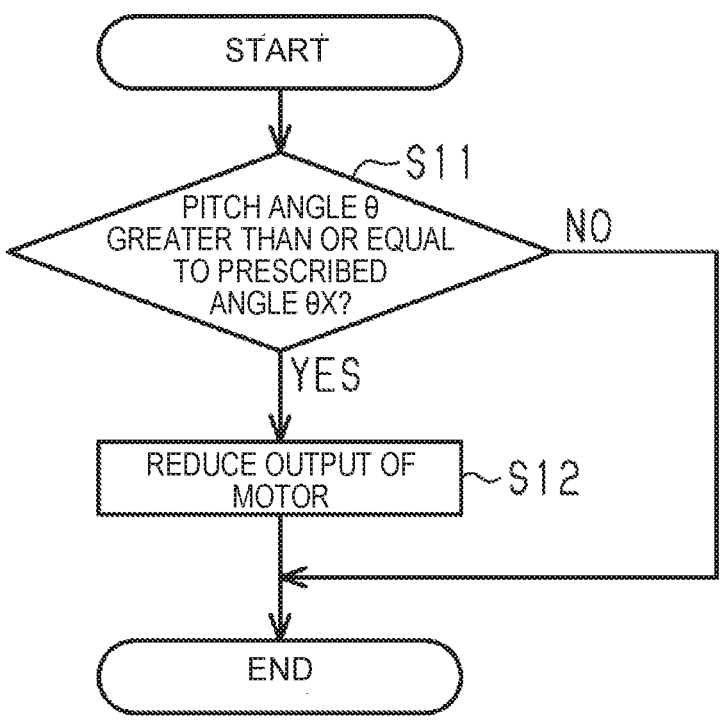
FIG. 3 is a flowchart of a torque control process executed by the controller of the bicycle driving device illustrated in FIG. 2.

The torque control process which is executed by the controller 60 will be described with reference to FIG. 3. The controller 60 determines whether or not the pitch angle θ is greater than or equal to a prescribed angle θX in Step S11. Information regarding the prescribed angle θX is stored in the storage unit 62. The prescribed angle θX is a pitch angle θ corresponding to the uplift of the front wheel 12. The prescribed angle θX is greater than "zero" degrees, for example, 45 degrees. The prescribed angle θX is preferably set to be larger than the slope angle of a common uphill slope. That is, the front wheel 12 of the bicycle 10 is inferred to be lifted up, when the pitch angle θ is greater than or equal to the prescribed angle θX.

When the pitch angle θ is less than the prescribed angle θX, the controller 60 ends the present process and executes the process of Step S11 again after a prescribed period. When the pitch angle θ is greater than or equal to the prescribed angle θX, the controller 60 ends the present process after reducing the output of the motor 56 to less than the output that is calculated from the output map or the calculation program in Step S12, and executes the process of Step S11 again after a prescribed period. When the pitch angle θ is greater than or equal to the prescribed angle θX, the controller 60 reduces the output of the motor 56. Specifically, the output of the motor 56 is set smaller than the output that is calculated based on the manual drive force and the bicycle speed at that time, and on the output map or the calculation program. Meanwhile, reducing the output includes setting the output to "zero." In Step S12, the controller 60 preferably sets the output of the motor 56 substantially to "zero." That is, when the pitch angle θ is greater than or equal to the prescribed angle θX, the controller 60 preferably stops the driving of the motor 56. Meanwhile, when at least one of the manual drive force and the bicycle speed is "zero," the output of the motor 56 which is defined in the output map or the calculation program is "zero." Accordingly, when the output of the motor 56 which is calculated based on the output map or the calculation program is "zero," the output of the motor 56 is maintained at "zero."

Figure 4:
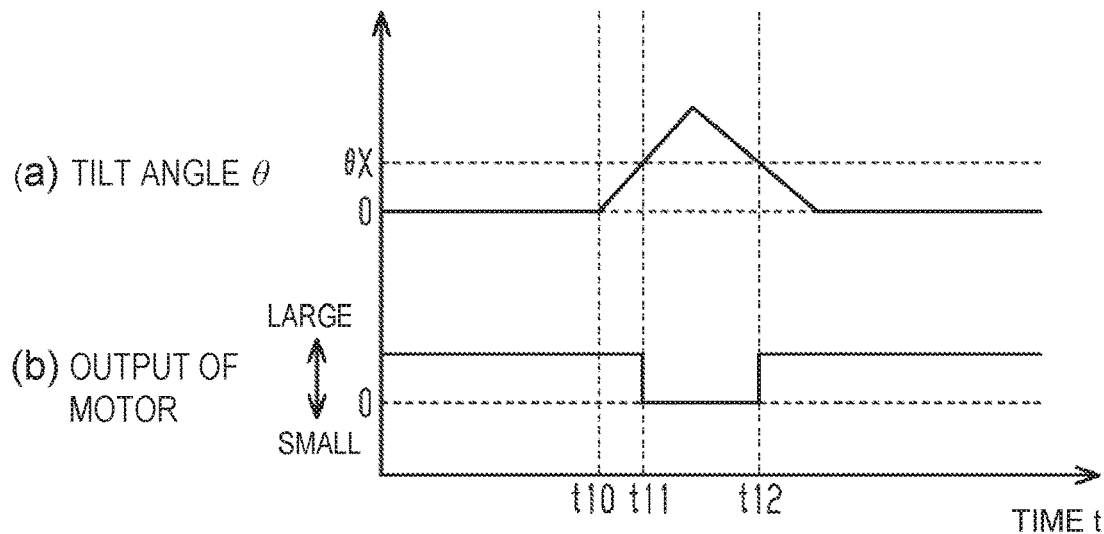
FIG. 4 is a timing chart showing an example of an execution mode of the torque control process illustrated in FIG. 3.

One example of the execution mode of the torque control process in which the controller 60 controls the motor 56 based on the pitch angle θ will be described with reference to FIG. 4. Time t10 indicates the time at which the front wheel 12 of the bicycle 10 traveling on a road with a slope angle of "zero" degrees is lifted up from the road surface and the pitch angle θ begins to rise. At this time, the controller 60 is causing the motor 56 to output a torque according to the output map or the calculation program.

Time t11 indicates the time at which the pitch angle θ transitions from less than the prescribed angle θX to greater than or equal to the prescribed angle θX. At this time, the controller 60 sets the output of the motor 56 to "zero." Consequently, the output of the motor 56 becomes less than the output that is calculated from the output map or the calculation program.

Time t12 indicates the time at which the pitch angle θ transitions from greater than or equal to the prescribed angle θX to less than the prescribed angle θX. At this time, the controller 60 causes the motor 56 to output a torque according to the output map. Accordingly, the output of the motor 56 becomes greater than during the period from time 11 to time t12.

The action and effects of the bicycle driving device 50 will be described.

(1) Since the controller 60 reduces the output of the motor 56 when the pitch angle θ is greater than or equal to the prescribed angle θX at which the front wheel 12 is inferred to be lifted up, it is possible to improve the stability of the behavior of the bicycle 10.

(2) The bicycle driving device 50 detects an uplift of the front wheel 12 based on the output of the tilt sensor 68. Since the tilt sensor 68 can be attached to any part of the bicycle 10, it is possible to improve the degree of freedom of design.

(3) The controller 60 can set the output of the motor 56 substantially to "zero." Accordingly, the stability of the behavior of the bicycle 10 when the front wheel 12 is lifted can be further improved.

Second Embodiment

Figure 5:
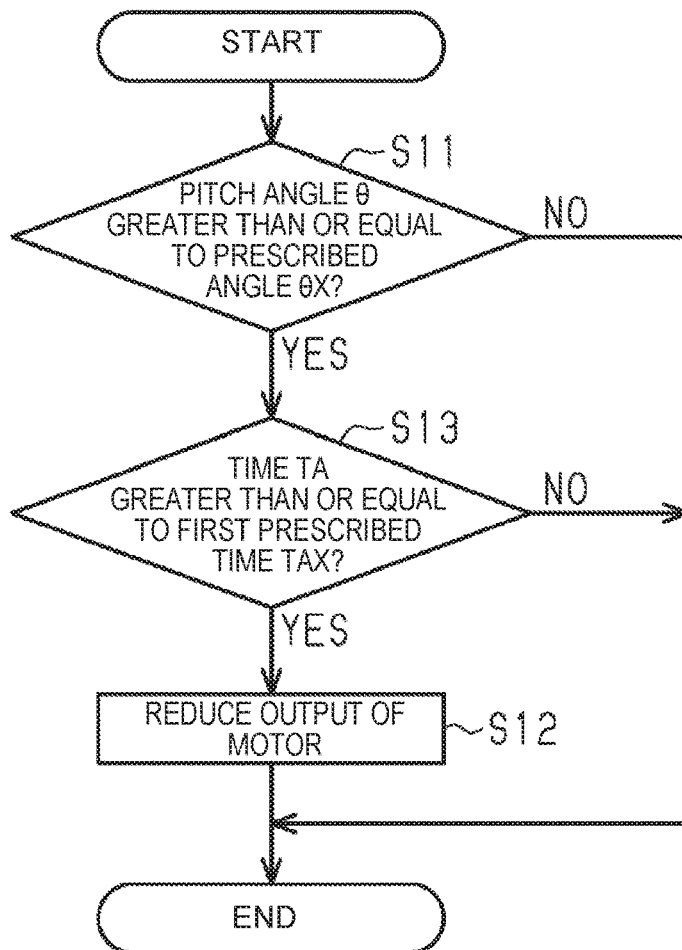
FIG. 5 is a flowchart of a torque control process executed by the controller of the bicycle driving device illustrated in FIG. 2 in accordance with a second embodiment.

The bicycle driving device 50 of the second embodiment will be described with reference to FIGS. 2 and 5. The configurations that are common to the first embodiment are given the same reference numbers as the first embodiment, and the descriptions thereof will be omitted. In the torque control process, the controller 60 shown in FIG. 2 reduces the output of the motor 56 based on the duration of time TA that the pitch angle θ is greater than or equal to the prescribed angle θX, is a first prescribed time TAX or more. Information regarding the prescribed time TAX is stored in the storage unit 62.

The torque control process which is executed by the controller 60 of the second embodiment will be described with reference to FIG. 5. When the pitch angle θ is greater than or equal to the prescribed angle θX in Step S11, the controller 60 determines whether or not the duration of time TA that the pitch angle θ has been greater than or equal to the prescribed angle θX, is greater than or equal to the first prescribed time TAX, in Step S13. When the time TA is less than the first prescribed time TAX, the controller 60 ends the present process and executes the process of Step S11 again after a prescribed period. When the time TA is greater than or equal to the first prescribed time TAX, the controller 60 ends the present process after reducing the output of the motor 56 to less than the output that is calculated from the output map or the calculation program in Step S12, and executes the process of Step S11 again after a prescribed period.

The bicycle driving device 50 of the second embodiment exerts the following effects, in addition to the effects of the bicycle driving device 50 of the first embodiment.

(4) The controller 60 reduces the output of the motor 56 based on time TA is greater than or equal to a first prescribed time TAX. Accordingly, in the case that the front wheel 12 is lifted up from the road surface and immediately thereafter lands on the road surface, it is possible to prevent the output of the motor 56 from being reduced.

Third Embodiment

The bicycle driving device 50 of the third embodiment will be described with reference to FIGS. 2 and 6. The configurations that are common to the first embodiment are given the same reference numbers as the first embodiment, and the descriptions thereof will be omitted. The controller 60 shown in FIG. 2 programmed to calculate a change rate D of the pitch angle θ based on the output of the tilt sensor 68. The controller 60 reduces the output of the motor 56 based on the pitch angle θ is greater than or equal to the prescribed angle θX in the torque control process, and, that the change rate D of the pitch angle θ is greater than or equal to a prescribed angular velocity DX. The controller 60 programmed to calculate the change rate D of the pitch angle θ by integrating the pitch angles θ that are inputted from the tilt sensor 68. Meanwhile, a configuration can also be employed in which the angular velocity around the pitch axis is outputted from the tilt sensor 68 to the controller 60. In this case, the controller 60 uses the inputted angular velocity as the change rate D of the pitch angle θ.

The torque control process which is executed by the controller 60 of the third embodiment will be described with reference to FIG. 6. When the pitch angle θ is greater than or equal to the prescribed angle θX in Step S11, the controller 60 determines whether or not the change rate D of the pitch angle θ is greater than or equal to the prescribed angular velocity DX in Step S14. When the change rate D of the pitch angle θ is less than the prescribed angular velocity DX, the controller 60 ends the present process and executes the step of Step S11 again after a prescribed period. When the change rate D of the pitch angle θ is greater than or equal to the prescribed angular velocity DX, the controller 60 ends the present process after reducing the output of the motor 56 to less than the output that is calculated from the output map or the calculation program in Step S12, and executes the process of Step S11 again after a prescribed period.

The bicycle driving device 50 of the third embodiment exerts the following effects, in addition to the effects of the bicycle driving device 50 of the first embodiment.

(5) When an uplift of the front wheel 12 occurs, the pitch angle θ is changed more abruptly than when traveling a common uphill slope. The controller 60 reduces the output of the motor 56 based on the change rate D of the pitch angle θ is greater than or equal to the prescribed angular velocity DX. Accordingly, compared to when detecting an uplift of the front wheel 12 based only on the size of the pitch angle θ, it is possible to improve the detection accuracy of whether or not the front wheel 12 is being lifted up, and to suppress a reduction in the output of the motor 56 when the front wheel 12 is not being lifted up.

Fourth Embodiment

Figure 7:
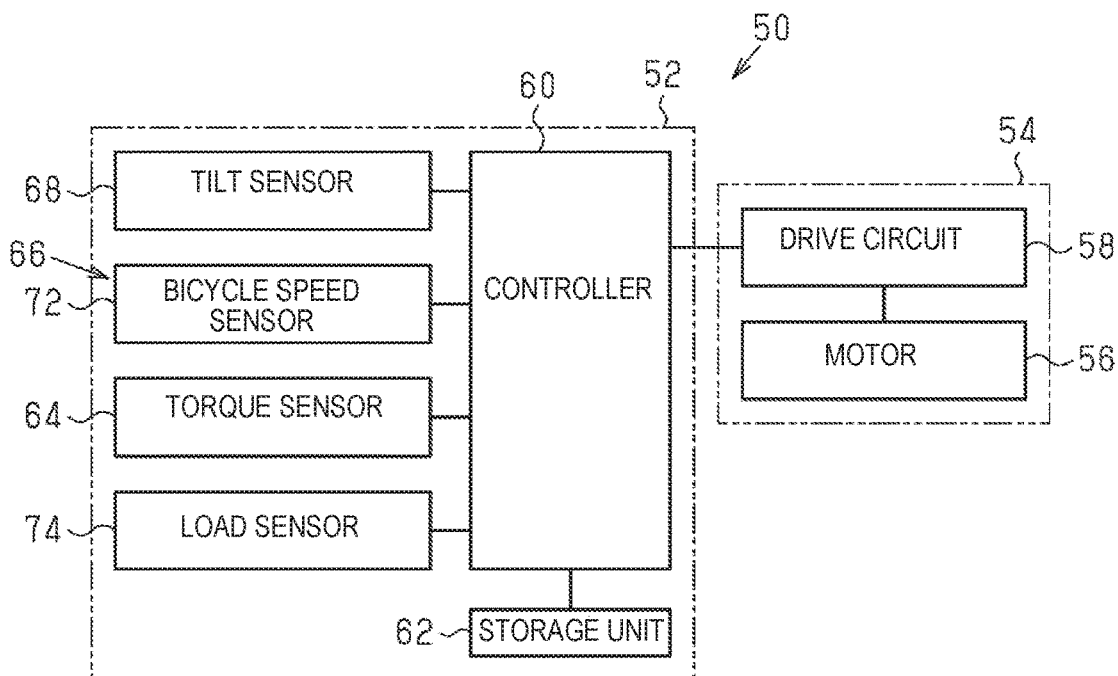
FIG. 7 is a block diagram of a bicycle driving device in accordance with a fourth embodiment.
Figure 8:
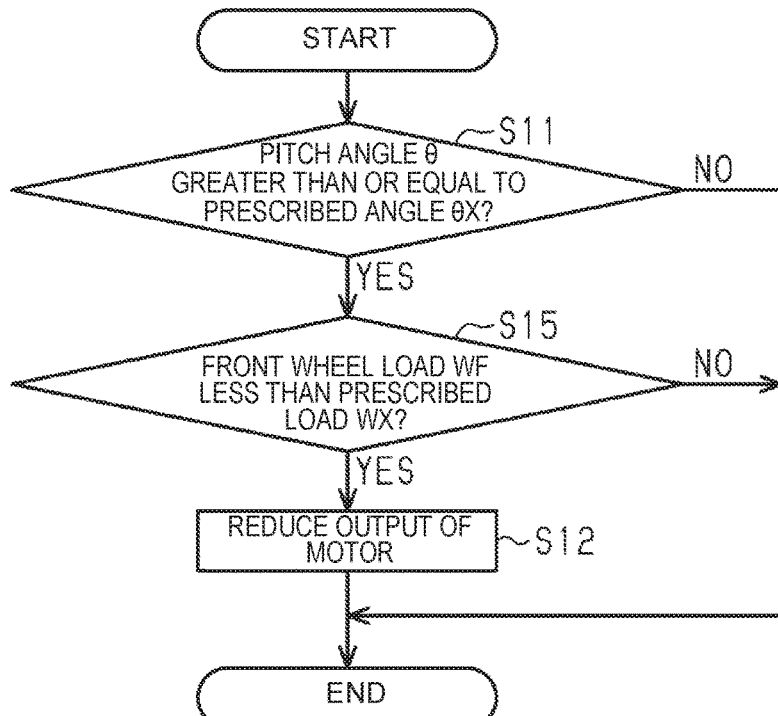
FIG. 8 is a flowchart of a torque control process executed by the controller of the bicycle driving device illustrated in FIG. 7 in accordance with the fourth embodiment.

The bicycle driving device 50 of the fourth embodiment will be described with reference to FIGS. 7 and 8. The configurations that are common to the first embodiment are given the same reference numbers as the first embodiment, and the descriptions thereof will be omitted. As shown in FIG. 7, the bicycle control apparatus 52 further comprises a load sensor 74 for detecting the load of the front wheel 12. The load sensor 74 is, for example, provided to an axle 12A of the front wheel 12 shown in FIG. 1. The load sensor 74 is, for example, a load cell, which outputs to the controller 60 a signal corresponding to the pressure that is applied from the front wheel 12 to the load sensor 74.

The controller 60 reduces the output of the motor 56 based on the pitch angle θ is greater than or equal to the prescribed angle θX in the torque control process, and, that the load that is applied to the front wheel 12 (hereinafter referred to as "front wheel load WF") is less than a prescribed load WX. A value for detecting an uplift of the front wheel 12 is set as the prescribed load WX. For example, "zero" kg or a value in the vicinity of "zero" kg is set as the prescribed load WX.

The torque control process which uses the output of the tilt sensor 68 and which is executed by the controller 60 of the fourth embodiment will be described with reference to FIG. 8. When the pitch angle θ is greater than or equal to the prescribed angle θX in Step S11, the controller 60 determines whether or not the front wheel load WF is less than the prescribed load WX in Step S15. When the front wheel load WF is greater than or equal to the prescribed load WX, the controller 60 ends the present process and executes the process of Step S11 again after a prescribed period. When the front wheel load WF is less than the prescribed load WX, the controller 60 ends the present process after reducing the output of the motor 56 to less than the output that is calculated from the output map or the calculation program in Step S12, and executes the process of Step S11 again after a prescribed period.

The bicycle driving device 50 of the fourth embodiment exerts the following effects, in addition to the effects of the bicycle driving device 50 of the first embodiment.

(6) The controller 60 reduces the output of the motor 56 based on the pitch angle θ is greater than or equal to the prescribed angle θX, and, that the front wheel load WF is less than the prescribed load WX. Accordingly, compared to when detecting an uplift of the front wheel 12 based only on the size of the pitch angle θ, it is possible to improve the detection accuracy of whether or not the front wheel 12 is being lifted up, and to suppress a reduction in the output of the motor 56 when the front wheel 12 is not being lifted up.

Fifth Embodiment

Figure 9:
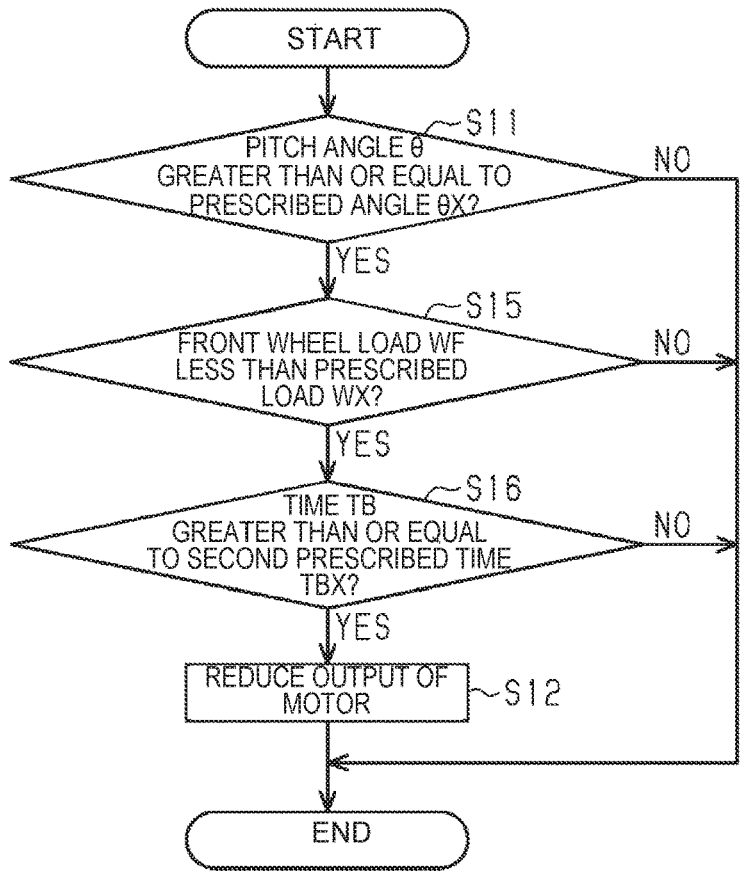
FIG. 9 is a flowchart of a torque control process executed by the controller of the bicycle driving device illustrated in FIG. 7 in accordance with a fifth embodiment.

The bicycle driving device 50 of the fifth embodiment will be described with reference to FIGS. 7 and 9. The configurations that are common to the fourth embodiment are given the same reference numbers as the fourth embodiment, and the descriptions thereof will be omitted. In the torque control process, the controller 60 shown in FIG. 7 reduces the output of the motor 56 based on the pitch angle θ is greater than or equal to the prescribed angle θX, and, that the duration of time TB that the front wheel load WF has been less than the prescribed load WX, is a second prescribed time TBX or more. Information regarding the prescribed time TBX is stored in the storage unit 62.

The torque control process which uses the output of the tilt sensor 68 and which is executed by the controller 60 of the fifth embodiment will be described with reference to FIG. 9.

When the pitch angle θ is greater than or equal to the prescribed angle θX in Step S11, the controller 60 determines whether or not the front wheel load WF is less than a prescribed load WX in Step S15. When the front wheel load WF is less than the prescribed load WX, the controller 60 determines whether or not the duration of time TB that the front wheel load WF is less than the prescribed load WX, is the second prescribed time TBX or more in Step S16. When the time TB is less than the second prescribed time TBX, the controller 60 ends the present process and executes the process of Step S11 again after a prescribed period. When the time TB is greater than or equal to the second prescribed time TBX, the controller 60 ends the present process after reducing the output of the motor 56 to less than the output that is calculated from the output map or the calculation program in Step S12, and executes the process of Step S11 again after a prescribed period.

The bicycle driving device 50 of the fifth embodiment exerts the following effects, in addition to the effects of the bicycle driving device 50 of the fourth embodiment.

(7) The controller 60 reduces the output of the motor 56 based on time TB is greater than or equal to the second prescribed time TBX. Accordingly, in the case that the front wheel 12 is lifted up from the road surface and immediately thereafter lands on the road surface, it is possible to prevent the output of the motor 56 from being reduced.

Sixth Embodiment

Figure 10:
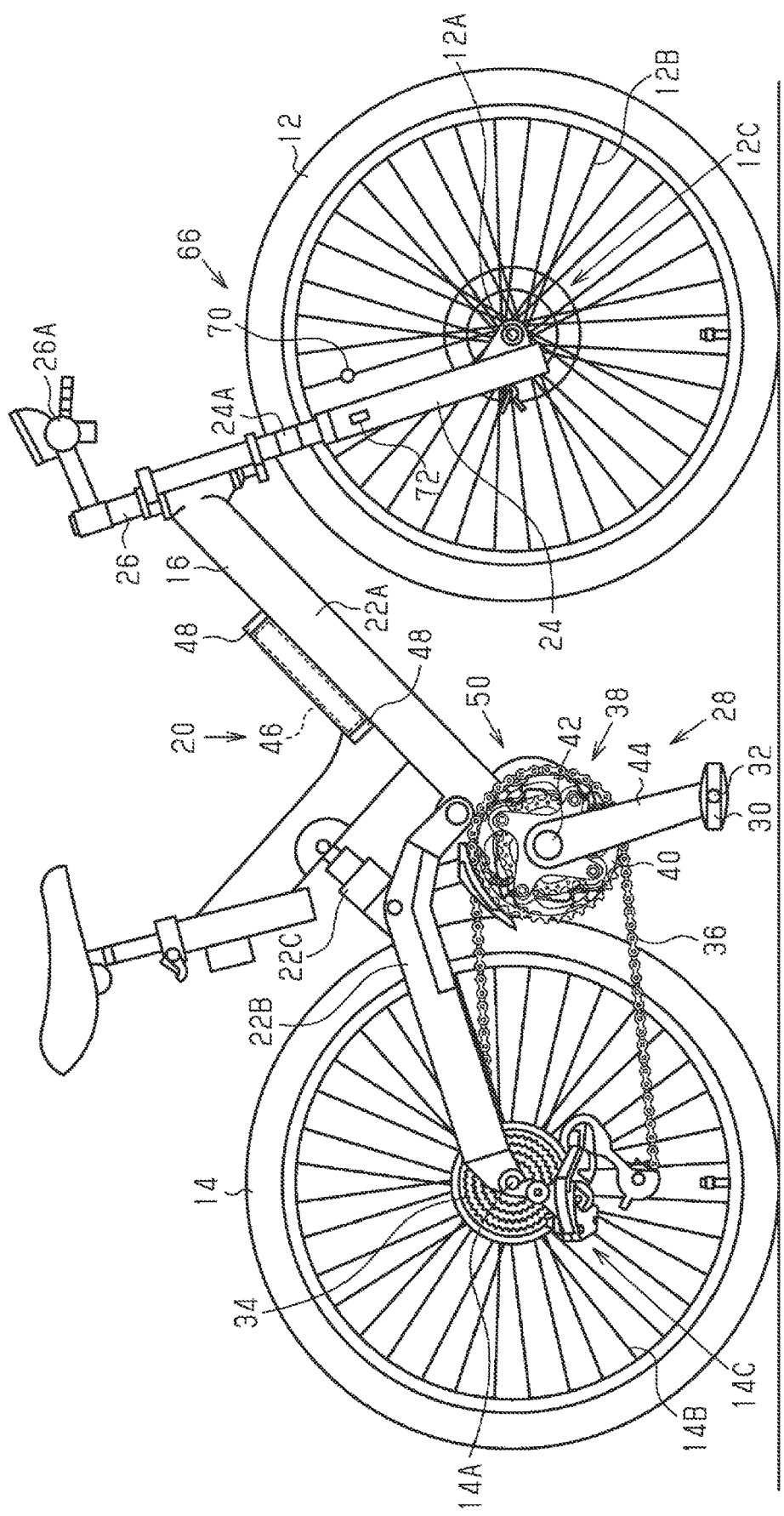
FIG. 10 is a side elevational view of a bicycle equipped with a bicycle control apparatus in accordance with a sixth embodiment.

The bicycle driving device 50 of the sixth embodiment will be described with reference to FIGS. 10 to 12. The configurations that are common to the first embodiment are given the same reference numbers as the first embodiment, and the descriptions thereof will be omitted. As shown in FIG. 10, the bicycle body 16 comprises a front frame 22A, a rear frame 22B, the front fork 24 and the handlebar 26A. The front frame 22A is connected to the front fork 24. The rear frame 22B connects the front frame 22A and the axle 14A of the rear wheel 14. A suspension 22C which absorbs vibrations of the bicycle 10 is provided between the front frame 22A and the rear frame 22B. The suspension 22C is, for example, a hydraulic suspension. Hereinafter, a suspension 22C will be referred to as the rear suspension 22C.

The front fork 24 comprises a suspension 24A which absorbs vibrations of the bicycle 10. A suspension 24A is, for example, a hydraulic suspension. Hereinafter, a suspension 24A will be referred to as the front suspension 24A.

Figure 11:
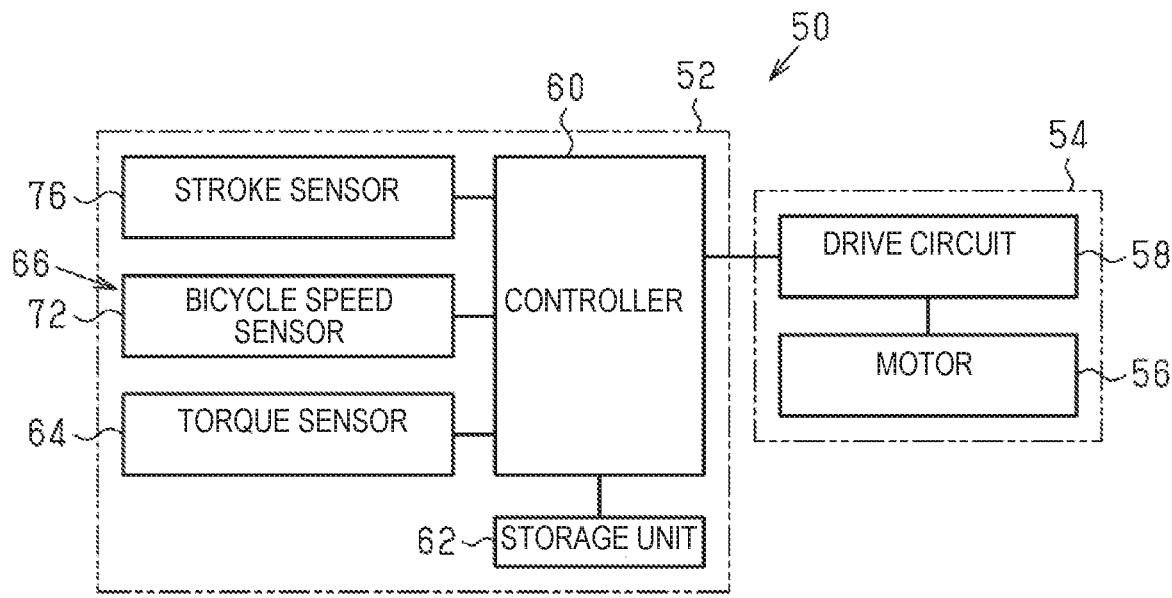
FIG. 11 is a block diagram of a bicycle driving device including the bicycle control apparatus illustrated in FIG. 10 in accordance with the sixth embodiment.
Figure 12:
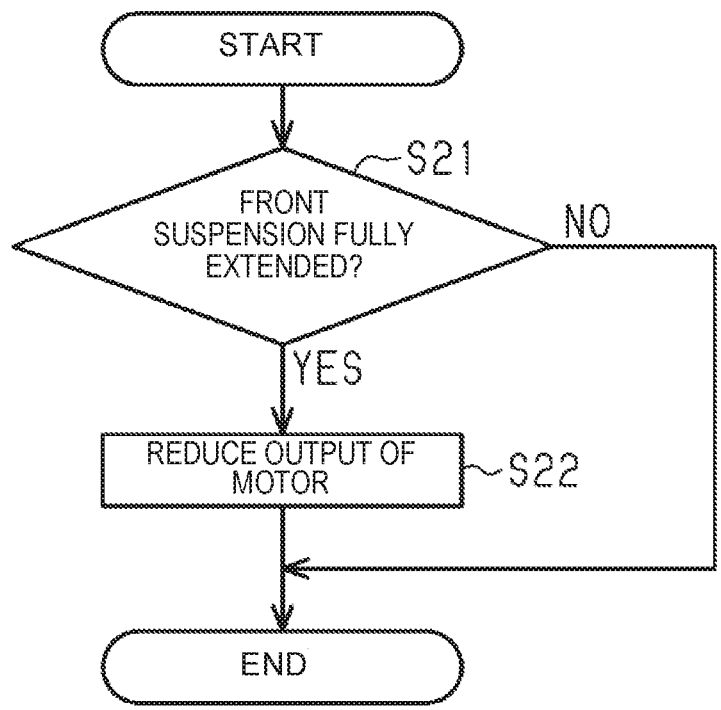
FIG. 12 is a flowchart of a torque control process executed by the controller of the bicycle driving device illustrated in FIG. 11 in accordance with the sixth embodiment.

As shown in FIG. 11, the bicycle control apparatus 52 comprises a stroke sensor 76. The stroke sensor 76 is, for example, a linear encoder. The stroke sensor 76 is attached to the front suspension 24A (refer to FIG. 10). The stroke sensor 76 outputs a signal corresponding to the length LF of the front suspension 24A to the controller 60. The controller 60 controls the motor 56 based on the state of the front suspension 24A. Specifically, the controller 60 reduces the output of the motor 56 when the state of the front suspension 24A is a prescribed state. The prescribed state includes a state in which the front suspension 24A is fully extended.

The torque control process which uses the output of the stroke sensor 76 will be described with reference to FIG. 12. The controller 60 determines whether or not the front suspension 24A is in a fully extended state in Step S21. Whether or not the front suspension 24A is in a fully extended state can be determined, for example, based on a comparison between the maximum length LFA of the front suspension 24A when fully extended, which is stored in the storage unit 62 in advance (refer to FIG. 11), and the length LF of the front suspension 24A that is detected by the stroke sensor 76. Specifically, the front suspension 24A is determined to be in a fully extended state, when the length LF of the front suspension 24A detected by the stroke sensor 76 is greater than or equal to the maximum length LFA. The front suspension 24A can also be determined to be in a fully extended state, when the length LF of the front suspension 24A is less than the maximum length LEA and is in the vicinity of the maximum length LFA.

When the front suspension 24A is not in the fully extended state, the controller 60 ends the present process and executes the process of Step S21 again after a prescribed period. When the front suspension 24A is in the fully extended state, the controller 60 ends the present process after reducing the output of the motor 56 to less than the output that is calculated from the output map or the calculation program in Step S22, and executes the process of Step S21 again after a prescribed period.

The action and effects of the bicycle driving device 50 of the sixth embodiment will be described.

(1) In the bicycle 10 comprising the front suspension 24A, a state exists in which the front suspension 24A is fully extended when a state is formed in which the front wheel 12 is lifted up off of the road or around. In other words, the controller 60 is able to detect an uplift of the front wheel 12 by detecting a fully extended state of the front suspension 24A. The controller 60 reduces the output of the motor 56 when the front suspension 24A is in a fully extended state. Accordingly, the stability of the behavior of the bicycle 10 can be improved.

Seventh Embodiment

Figure 13:
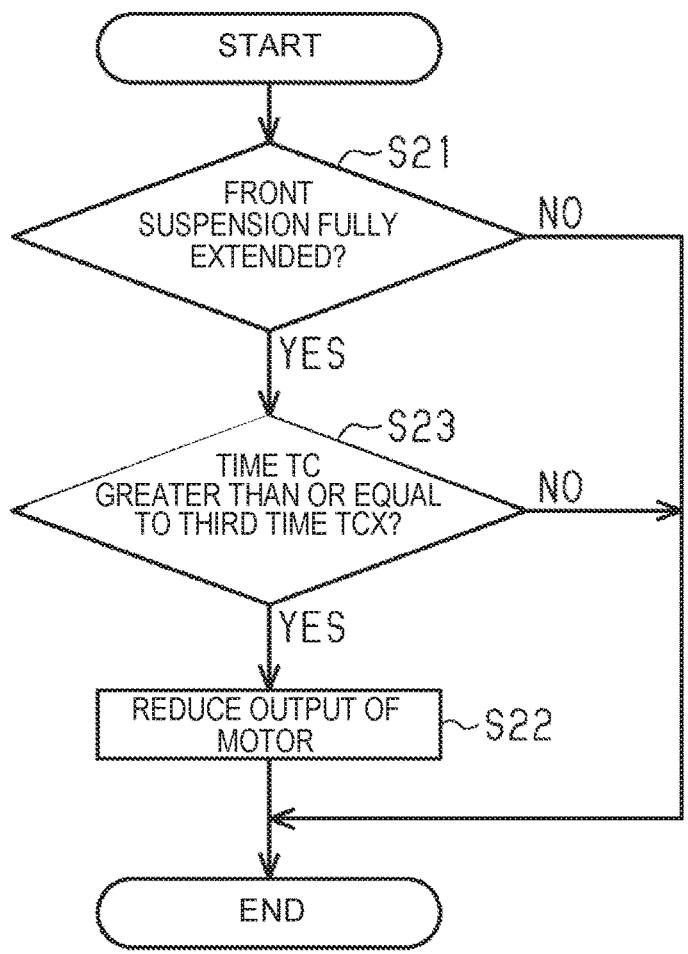
FIG. 13 is a flowchart of a torque control process executed by the controller of the bicycle driving device illustrated in FIG. 11 in accordance with a seventh embodiment.

The bicycle driving device 50 of the seventh embodiment will be described with reference to FIGS. 11 and 13. The configurations that are common to the sixth embodiment are given the same reference numbers as the sixth embodiment, and the descriptions thereof will be omitted. In the torque control process, the controller 60 shown in FIG. 11 reduces the output of the motor 56 based on the duration of time TC that the front suspension 24A has been in a fully extended state, is a third prescribed time TCX or more.

The torque control process which is executed by the controller 60 of the seventh embodiment will be described with reference to FIG. 13. When the front suspension 24A is fully extended in Step S21, the controller 60 determines whether or not the duration of time IC that the front suspension 24A has been in a fully extended state, is the third prescribed time TCX or more in Step S23. Information regarding the prescribed time TCX is stored in the storage unit 62. When the time IC is less than the third prescribed time TCX, the controller 60 ends the present process and executes the process of Step S21 again after a prescribed period. When the time TC is greater than or equal to the third prescribed time TCX, the controller 60 ends the present process after reducing the output of the motor 56 to less than the output that is calculated from the output map or the calculation program in Step S22, and executes the process of Step S21 again after a prescribed period.

The bicycle driving device 50 of the seventh embodiment exerts the following effects, in addition to the effects of the bicycle driving device 50 of the sixth embodiment.

(2) The controller 60 reduces the output of the motor 56 based on time TC is greater than or equal to the third prescribed time TCX. Accordingly, in the case that the front wheel 12 is lifted up from the road surface and immediately thereafter lands on the road surface, it is possible to prevent the output of the motor 56 from being reduced.

Eighth Embodiment

Figure 14:
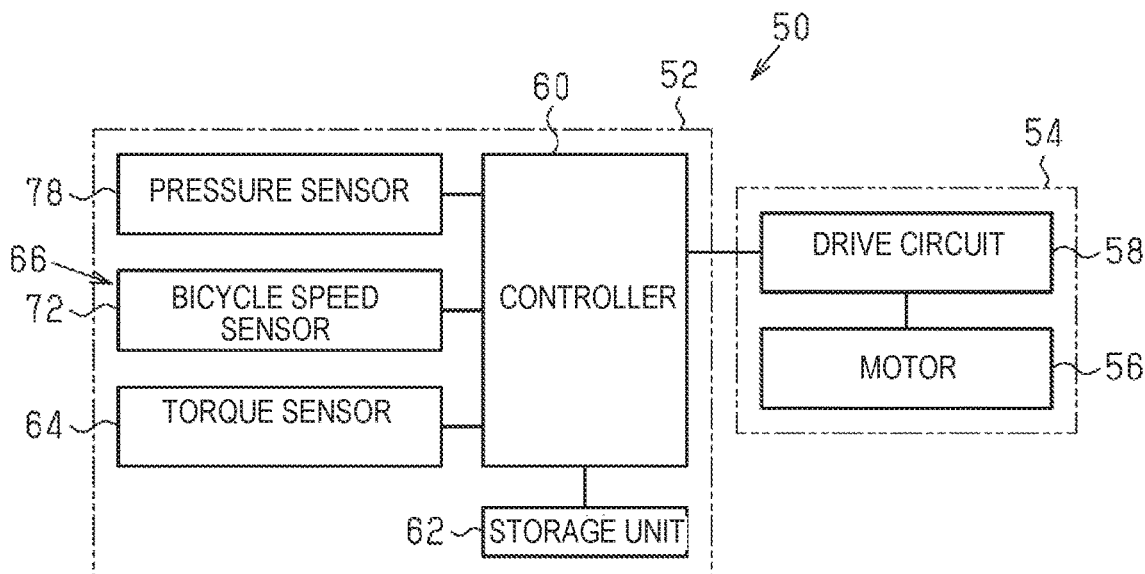
FIG. 14 is a block diagram of a bicycle driving device including a bicycle control apparatus having a controller in accordance with an eighth embodiment.
Figure 15:
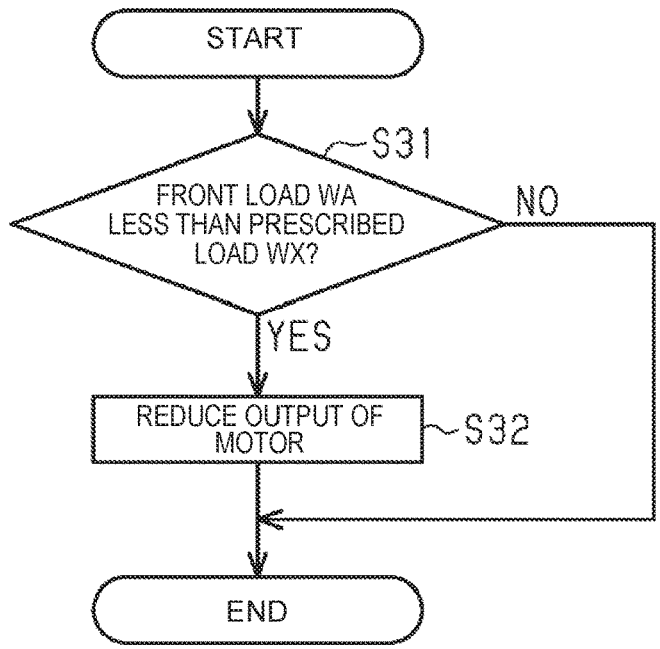
FIG. 15 is a flowchart of a torque control process executed by the controller of the bicycle driving device illustrated in FIG. 14 in accordance with the eighth embodiment.

The bicycle driving device 50 of the eighth embodiment will be described with reference to FIGS. 10, 14 and 15. The configurations that are common to the sixth embodiment are given the same reference numbers as the sixth embodiment, and the descriptions thereof will be omitted. As shown in FIG. 14, the bicycle control apparatus 52 comprises a pressure sensor 78. The pressure sensor 78 is provided to the front suspension 24A (refer to FIG. 10). The pressure sensor 78 outputs a signal corresponding to the pressure of the oil that is filled inside the front suspension 24A to the controller 60.

The controller 60 controls the motor 56 based on the state of the front suspension 24A. Specifically, the controller 60 reduces the output of the motor 56 when the state of the front suspension 24A is a prescribed state. The prescribed state includes a state in which the load that is applied to the front suspension 24A (hereinafter referred to as "front load WA") is less than a prescribed load WX. The controller 60 programmed to calculate the front load WA based on the output of the pressure sensor 78. Meanwhile, since the output of the pressure sensor 78 is a value that reflects the front load WA, the output of the motor 56 can also be controlled based on the pressure included in the output of a pressure sensor 78 is less than a prescribed pressure.

The torque control process which is executed by the controller 60 of the eighth embodiment will be described with reference to FIG. 15. The controller 60 determines whether or not the front load WA is less than the prescribed load WX in Step S31. The prescribed load WX is, for example, "zero" kg or a value in the vicinity of "zero" kg.

When the front load WA is greater than or equal to the prescribed load WX, the controller 60 ends the present process and executes the process of Step S31 again after a prescribed period. When the front load \VA is less than the prescribed load WX, the controller 60 ends the present process after reducing the output of the motor 56 to less than the output that is calculated from the output map or the calculation program in Step S32, and executes the process of Step S31 again after a prescribed period.

The action and effects of the bicycle driving device 50 of the eighth embodiment will be described.

(1) In the bicycle 10 comprising the front suspension 24A, the front load WA is reduced when a state is formed in which the front wheel 12 is lifted up off of the road or ground. In other words, the controller 60 is able to detect an uplift of the front wheel 12 by detecting the front load WA. The controller 60 reduces the output of the motor 56 when the front load WA is less than the prescribed load WX. Accordingly, the stability of the behavior of the bicycle 10 can be improved.

Ninth Embodiment

Figure 16:
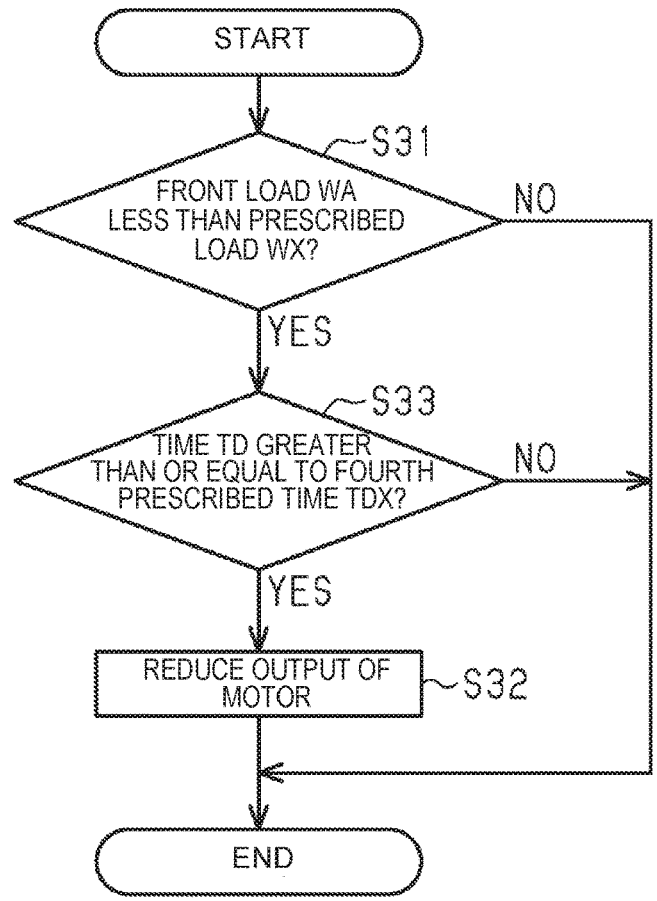
FIG. 16 is a flowchart of a torque control process executed by the controller of the bicycle driving device illustrated in FIG. 14 in accordance with a ninth embodiment.

The bicycle driving device 50 of the ninth embodiment will be described with reference to FIGS. 14 and 16. The configurations that are common to the eighth embodiment are given the same reference numbers as the eighth embodiment, and the descriptions thereof will be omitted. In the torque control process, the controller 60 shown in FIG. 14 reduces the output of the motor 56 based on the duration of time TD that the front load WA is less than the prescribed load WX, is a fourth prescribed time TDX or more. Information regarding the prescribed time TDX is stored in the storage unit 62.

The torque control process which uses the output of the tilt sensor 68 and which is executed by the controller 60 of the ninth embodiment will be described with reference to FIG. 16. When the front load WA is less than the prescribed load WX in Step S31, the controller 60 determines whether or not the duration of time TD that the front load WA has been less than the prescribed load WX, is the fourth prescribed time TDX or more in Step S33. When the time TD is less than the fourth prescribed time TDX, the controller 60 ends the present process and executes the process of Step S31 again after a prescribed period. When the time TD is greater than or equal to the fourth prescribed time TDX, the controller 60 ends the present process after reducing the output of the motor 56 to less than the output that is calculated from the output map or the calculation program in Step S32, and executes the process of Step S31 again after a prescribed period.

The bicycle driving device 50 of the ninth embodiment exerts the following effects, in addition to the effects of the bicycle driving device 50 of the eighth embodiment.

(2) The controller 60 reduces the output of the motor 56 based on time TD is greater than or equal to the fourth prescribed time TDX. Accordingly, in the case that the front wheel 12 is lifted up from the road surface and immediately thereafter lands on the road surface, it is possible to prevent the output of the motor 56 from being reduced.

Tenth Embodiment

Figure 17:
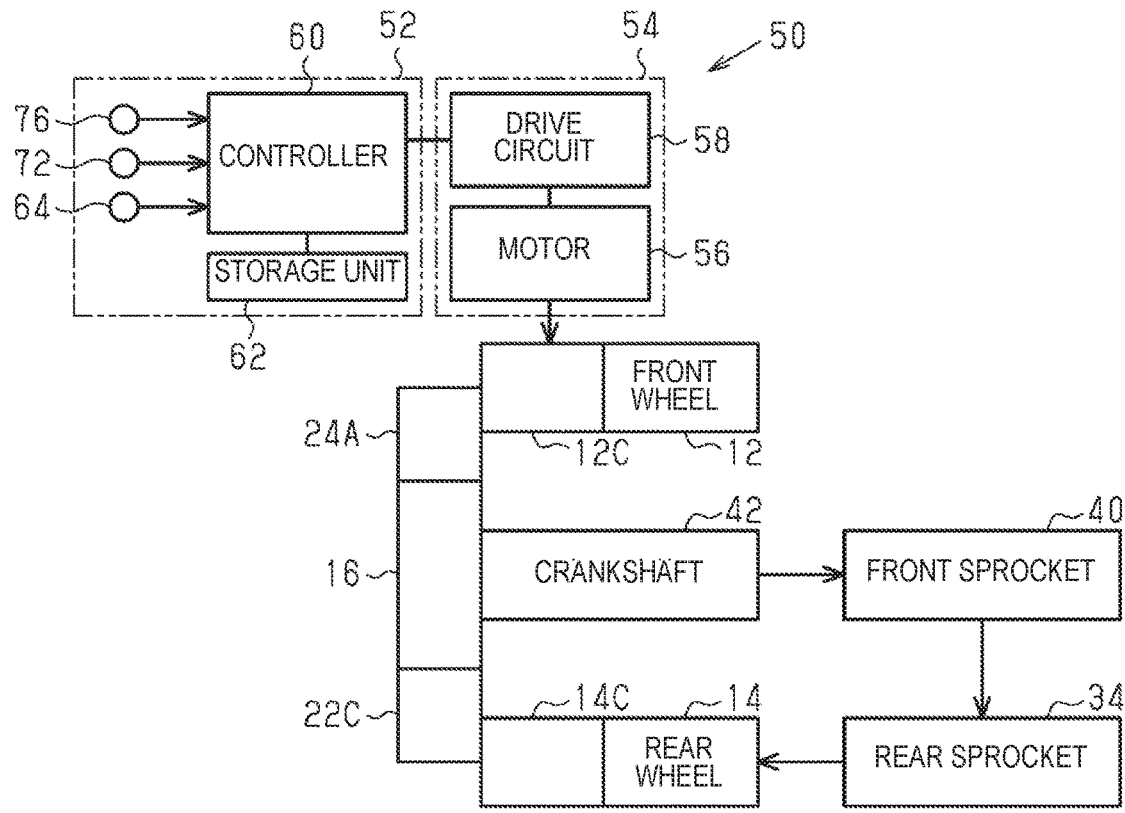
FIG. 17 is a block diagram of a bicycle driving device including a bicycle control apparatus having a controller in accordance with a tenth embodiment.
Figure 18:
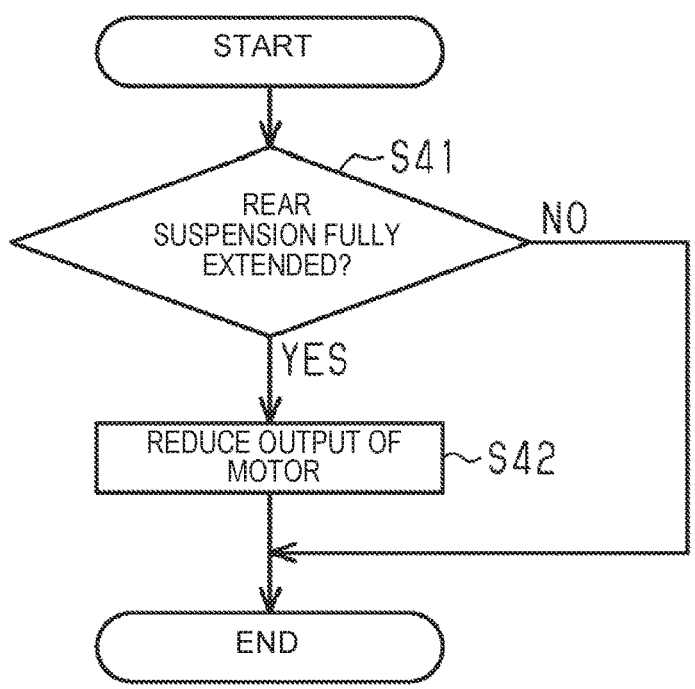
FIG. 18 is a flowchart of a torque control process executed by the controller of the bicycle driving device illustrated in FIG. 17 in accordance with the tenth embodiment.

The bicycle driving device 50 of the tenth embodiment will be described with reference to FIGS. 17 and 18. The configurations that are common to the sixth embodiment are given the same reference numbers as the sixth embodiment, and the descriptions thereof will be omitted. As shown in FIG. 17, the assist mechanism 54 is provided around a huh shaft of the hub 12C of the front wheel 12. An output shaft of the motor 56 is connected directly, or via a decelerator (not shown), to a hub shell (not shown) of the hub 12C. The motor 56 can be provided so as to apply a drive force to the rim or the tire of the front wheel 12 via a roller (not shown). The rotation of the front wheel 12 is assisted by the driving of the motor 56.

The stroke sensor 76 is attached to the rear suspension 22C. The stroke sensor 76 outputs a signal corresponding to the length LR of the rear suspension 22C to the controller 60. The controller 60 controls the motor 56 based on the state of the rear suspension 22C. Specifically, the controller 60 reduces the output of the motor 56 when the state of the rear suspension 22C is a prescribed state. The prescribed state includes a state in which the rear suspension 22C is fully extended.

The torque control process which uses the output of the stroke sensor 76 will be described with reference to FIG. 18. The controller 60 determines whether or not the rear suspension 22C is in a fully extended state in Step S41. Whether or not the rear suspension 22C is in a fully extended state can be determined, for example, based on a comparison between the maximum length LRA of the rear suspension 22C when fully extended, which is stored in the storage unit 62 in advance (refer to FIG. 17), and the length LR of the rear suspension 22C that is detected by a stroke sensor 76. Specifically, the rear suspension 22C is determined to be in a fully extended state, when the length LR of the rear suspension 22C detected by the stroke sensor 76 is greater than or equal to the maximum length LRA. The rear suspension 22C can also be determined to be in a fully extended state, when the length LR of the rear suspension 22C is less than the maximum length LRA and is in the vicinity of the maximum length LRA.

When the rear suspension 22C is not in the fully extended state, the controller 60 ends the present process and executes the process of Step S41 again after a prescribed period. When the rear suspension 22C is in the fully extended state, the controller 60 ends the present process after reducing the output of the motor 56 to less than the output that is calculated from the output map or the calculation program in Step S42, and executes the process of Step S41 again after a prescribed period.

The action and effects of the bicycle driving device 50 of the tenth embodiment will be described.

(1) In the bicycle 10 comprising the rear suspension 22C, a state exists in which the rear suspension 22C is fully extended when a state is formed in which the rear wheel 14 is lifted up off of the road or ground. In other words, the controller 60 is able to detect an uplift of the rear wheel 14 by detecting a fully extended state of the rear suspension 22C. The controller 60 reduces the output of the motor 56 when the rear suspension 22C is in a fully extended state. Accordingly, the stability of the behavior of the bicycle 10 can be improved.

Eleventh Embodiment

Figure 19:
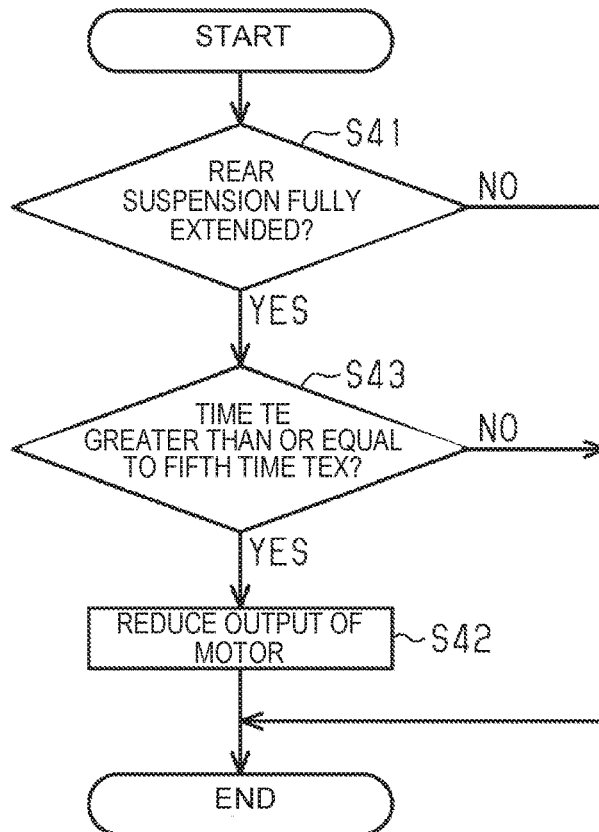
FIG. 19 is a flowchart of a torque control process executed by the controller of the bicycle driving device illustrated in FIG. 17 in accordance with an eleventh embodiment.

The bicycle driving device 50 of the eleventh embodiment will be described with reference to FIGS. 17 and 19. The configurations that are common to the tenth embodiment are given the same reference numbers as the tenth embodiment, and the descriptions thereof will be omitted. In the torque control process, the controller 60 shown in FIG. 17 reduces the output of the motor 56 based on the duration of time TE that the rear suspension 22C has been in a fully extended state, is a fifth prescribed time TEX or more.

The torque control process which is executed by the controller 60 of the eleventh embodiment will be described with reference to FIG. 19. When the rear suspension 22C is fully extended in Step S41, the controller 60 determines whether or not the duration of time TE that the rear suspension 22C has been in a fully extended state, is a fifth prescribed time TEX or more in Step S43. Information regarding the prescribed time TEX is stored in the storage unit 62. When the time TE is less than the fifth prescribed time TEX, the controller 60 ends the present process and executes the process of Step S41 again after a prescribed period. When the time TE is greater than or equal to the fifth prescribed time TEX, the controller 60 ends the present process after reducing the output of the motor 56 to less than the output that is calculated from the output map or the calculation program in Step S42, and executes the process of Step S41 again after a prescribed period.

The bicycle driving device 50 of the eleventh embodiment exerts the following effects, in addition to the effects of the bicycle driving device 50 of the tenth embodiment.

(2) The controller 60 reduces the output of the motor 56 based on time TE is greater than or equal to a fifth prescribed time TEX. Accordingly, in the case that the front wheel 12 is lifted up from the road surface and immediately thereafter lands on the road surface, it is possible to prevent the output of the motor 56 from being reduced.

Twelfth Embodiment

Figure 20:
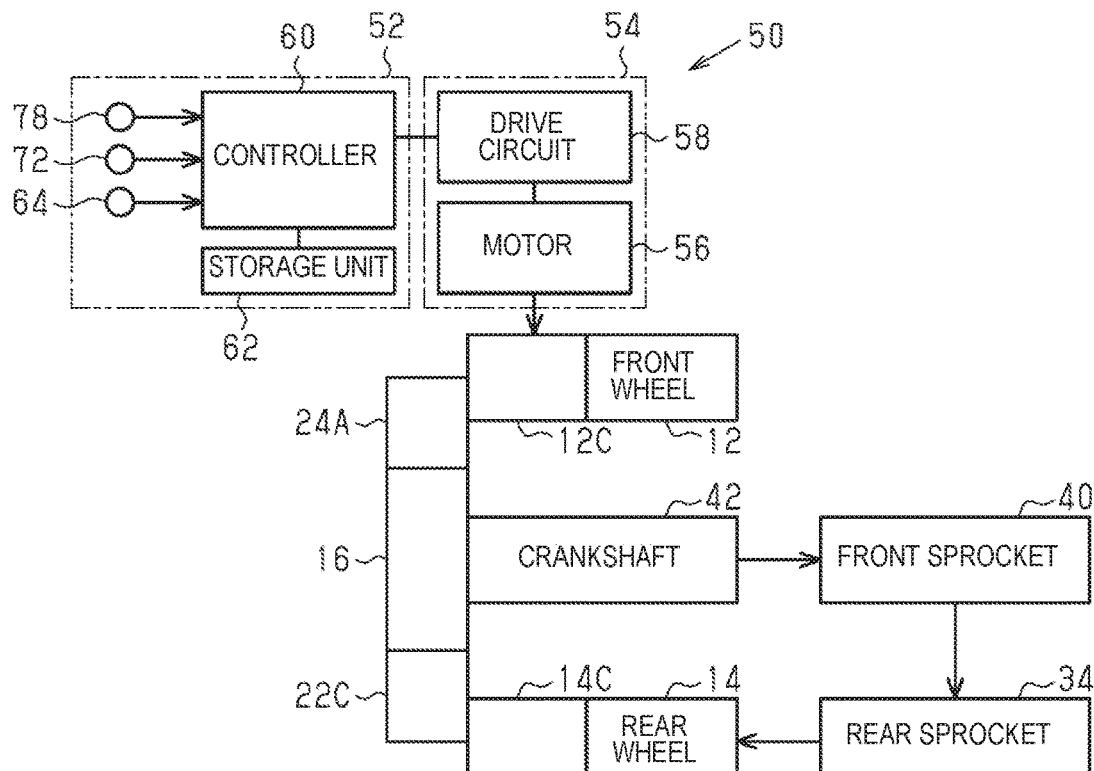
FIG. 20 is a block diagram of a bicycle driving device including a bicycle control apparatus having a controller in accordance with a twelfth embodiment.
Figure 21:
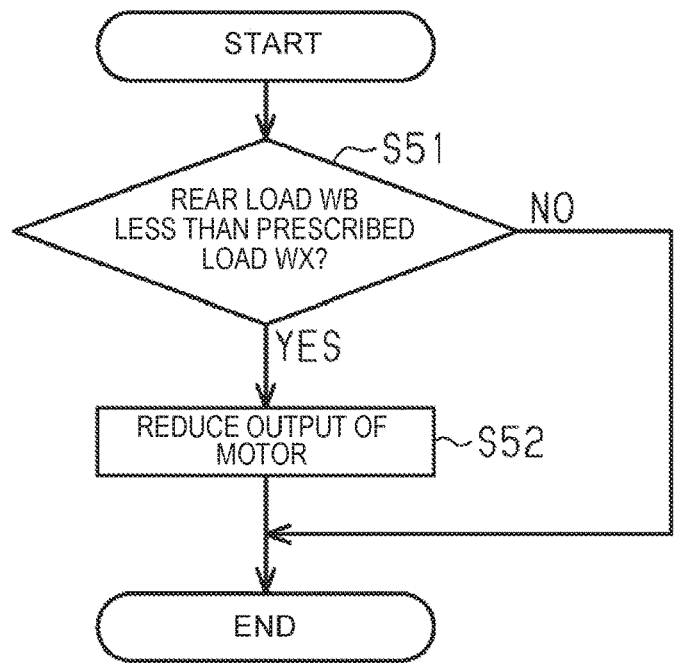
FIG. 21 is a flowchart of a torque control process executed by the controller of the bicycle driving device illustrated in FIG. 20 in accordance with the twelfth embodiment.

The bicycle driving device 50 of the twelfth embodiment will be described with reference to FIGS. 20 and 21. The configurations that are common to the sixth embodiment are given the same reference numbers as the sixth embodiment, and the descriptions thereof will be omitted. As shown in FIG. 20, a pressure sensor 78 is provided to the rear suspension 22C. The pressure sensor 78 outputs a signal corresponding to the pressure of the oil that is filled inside the rear suspension 22C (not shown) to the controller 60.

The controller 60 controls the motor 56 based on the state of the rear suspension 22C. Specifically, the controller 60 reduces the output of the motor 56 when the state of the rear suspension 22C is a prescribed state. The prescribed state includes a state in which the load that is applied to the rear suspension 22C (hereinafter referred to as "rear load WB") is less than the prescribed load WV The controller 60 programmed to calculate the rear load WB based on the output of the pressure sensor 78. Meanwhile, since the output of a pressure sensor 78 is a value that reflects the rear load WB, the output of the motor 56 can also be controlled based on the pressure included in the output of a pressure sensor 78 is less than a prescribed pressure.

The torque control process by the controller 60 of the twelfth embodiment will be described with reference to FIG. 21. The controller 60 determines whether or not the rear load WB is less than the prescribed load WX in Step S51. The prescribed load WX is, for example, "zero" kg or a value in the vicinity of "zero" kg. When the rear load WB is greater than or equal to the prescribed load WX, the controller 60 ends the present process and executes the process of Step S51 again after a prescribed period. When the rear load WB is less than the prescribed load WX, the controller 60 ends the present process after reducing the output of the motor 56 to less than the output that is calculated from the output map or the calculation program in Step S52, and executes the process of Step S51 again after a prescribed period.

The action and effects of the bicycle driving device 50 of the twelfth embodiment will be described.

(1) In the bicycle 10 comprising the rear suspension 22C, the rear load WB is reduced when a state is formed in which the rear wheel 14 is lifted up off of the road or ground. In other words, the controller 60 is able to detect an uplift of the rear wheel 14 by detecting the rear load WB. The controller 60 reduces the output of the motor 56 when the rear load WB

Thirteenth Embodiment

Figure 22:
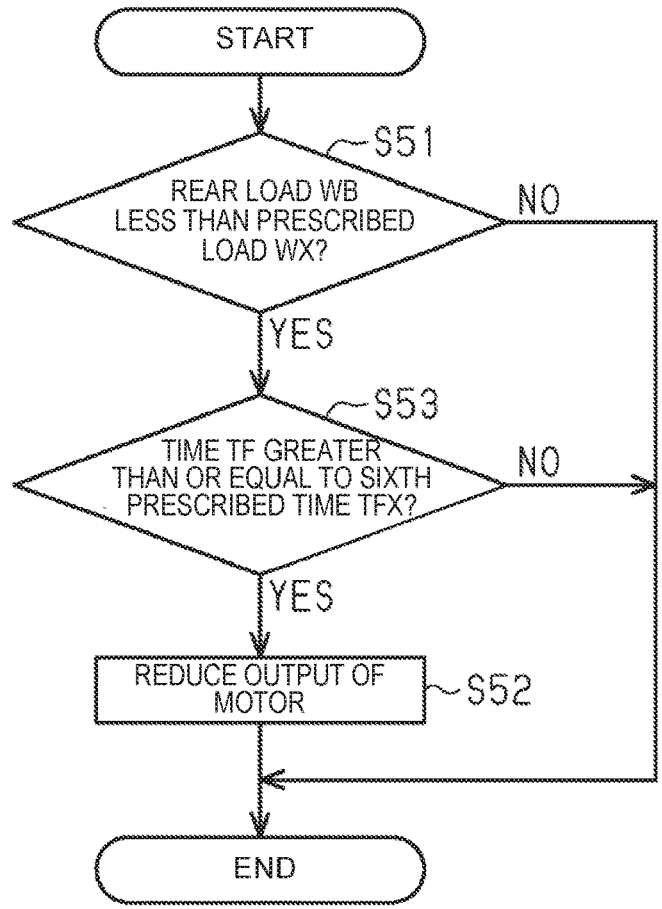
FIG. 22 is a flowchart of a torque control process executed by the controller of the bicycle driving device illustrated in FIG. 20 in accordance with a thirteenth embodiment.

The bicycle driving device 50 of the thirteenth embodiment will be described with reference to FIGS. 20 and 22. The configurations that are common to the twelfth embodiment are given the same reference numbers as the twelfth embodiment, and the descriptions thereof will be omitted. In the torque control process, the controller 60 shown in FIG. 20 reduces the output of the motor 56 based on the duration of time IF that the rear load WB is less than the prescribed load WX, is a sixth prescribed time TFX or more. Information regarding the prescribed time TFX is stored in the storage unit 62.

The torque control process which is executed by the controller 60 of the thirteenth embodiment will be described with reference to FIG. 22. When the rear load WB is less than the prescribed load WX in Step S51, the controller 60 determines whether or not the duration of time 11 that the rear load WB has been less than the prescribed load WX, is the sixth prescribed time TFX or more in Step S53. When the time TF is less than the sixth prescribed time TFX, the controller 60 ends the present process and executes the process of Step S51 again after a prescribed period. When the time TF is greater than or equal to the sixth prescribed time TFX, the controller 60 ends the present process after reducing the output of the motor 56 to less than the output that is calculated from the output map or the calculation program in Step S52, and executes the process of Step S51 again after a prescribed period.

The bicycle driving device 50 of the thirteenth embodiment exerts the following effects, in addition to the effects of the bicycle driving device 50 of the twelfth embodiment.

(2) The controller 60 reduces the output of the motor 56 based on time is greater than or equal to the sixth prescribed time TFX. Accordingly, in the case that the rear wheel 14 is lifted up from the road surface and immediately thereafter lands on the road surface, it is possible to prevent the output of the motor 56 from being reduced.

Fourteenth Embodiment

Figure 23:
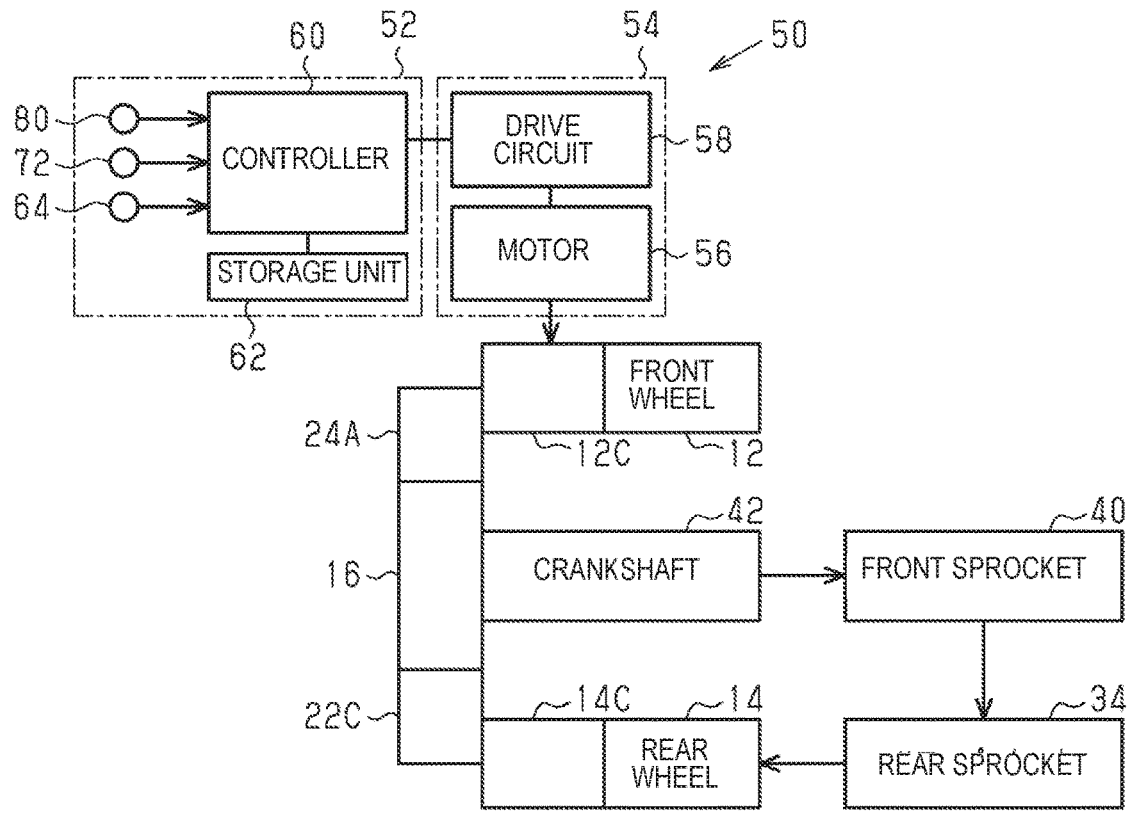
FIG. 23 is a block diagram of a bicycle driving device including a bicycle control apparatus having a controller in accordance with a fourteenth embodiment.
Figure 24:
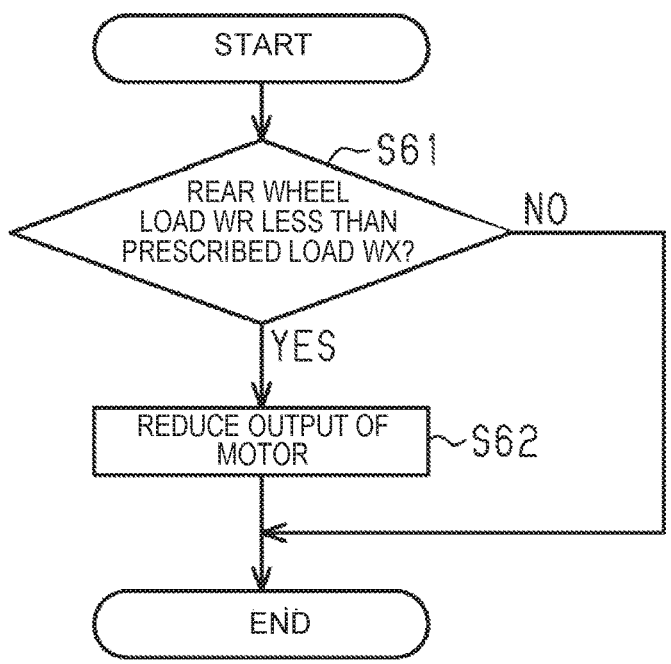
FIG. 24 is a flowchart of a torque control process executed by the controller of the bicycle driving device illustrated in FIG. 23 in accordance with the fourteenth embodiment.

The bicycle driving device 50 of the fourteenth embodiment will be described with reference to FIGS. 23 and 24. The configurations that are common to the tenth embodiment are given the same reference numbers as the tenth embodiment, and the descriptions thereof will be omitted. As shown in FIG. 23, the assist mechanism 54 is provided around a hub shaft of the hub 14C of the rear wheel 14. The output shaft of the motor 56 is connected directly, or via a decelerator (not shown), to a hub shell (not shown) of the hub 14C. The rotation of the rear wheel 14 is assisted by the driving of the motor 56.

The bicycle control apparatus 52 comprises a load sensor 80 for detecting the load that is applied to the rear wheel 14 (hereinafter referred to as "rear wheel load WR"). The load sensor 80 is, for example, disposed between the hub 14C and the axle 14A of the rear wheel 14. The load sensor 80 is, for example, a load cell, which outputs to the controller 60 a signal corresponding to the pressure that is applied from the rear wheel 14 to a load sensor 80. The controller 60 reduces the output of the motor 56 when the rear wheel load WR becomes less than the prescribed load WX in the torque control process. A value for detecting an uplift of the rear wheel 14 is set as the prescribed load WX. For example, "zero" kg or a value in the vicinity of "zero" kg is set as the prescribed load WX.

The torque control process which is executed by the controller 60 of the fourteenth embodiment will be described with reference to FIG. 24. The controller 60 determines whether or not the rear wheel load WR is less than the prescribed load WX in Step S61. When the rear wheel load WR is greater than or equal to the prescribed load WX, the controller 60 ends the present process and executes the process of Step S61 again after a prescribed period. When the rear wheel load WR is less than the prescribed load WX, the controller 60 ends the present process after reducing the output of the motor 56 to less than the output that is calculated from the output map or the calculation program in Step S62, and executes the process of Step S61 again after a prescribed period.

The action and effects of the bicycle driving device 50 will be described.

(1) When the motor 56 is carrying out driving in a state in which the rear wheel 14 is lifted up, the state in which the rear wheel 14 is lifted is easily continued, with the output of the motor 56 being applied to the front wheel 12. The rear wheel 14 is inferred to be lifted up, when the rear wheel load WR is less than the prescribed load WX. Since the controller 60 reduces the output of the motor 56 when the rear wheel load WR is less than the prescribed load WX, it is possible to improve the stability of the behavior of the bicycle 10.

Fifteenth Embodiment

Figure 25:
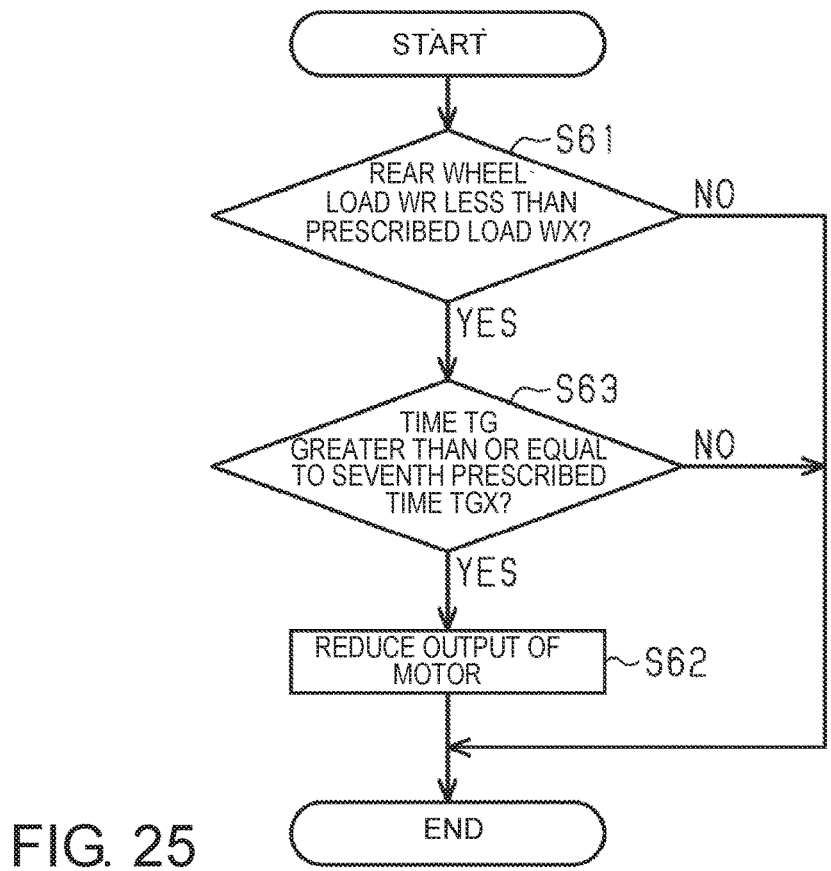
FIG. 25 is a flowchart of a torque control process executed by the controller of the bicycle driving device illustrated in FIG. 23 in accordance with a fifteenth embodiment.

The bicycle driving device 50 of the fifteenth embodiment will be described with reference to FIGS. 23 and 25. The configurations that are common to the fourteenth embodiment are given the same reference numbers as the fourteenth embodiment, and the descriptions thereof will be omitted. In the torque control process, the controller 60 shown in FIG. 23 reduces the output of the motor 56 based on the duration of time TG that the rear wheel load WR is less than the prescribed load WX, is a seventh prescribed time TGX or more. Information regarding the prescribed time TGX is stored in the storage unit 62.

The torque control process which is executed by the controller 60 of the fifteenth embodiment will be described with reference to FIG. 25. When the rear wheel load WR is less than the prescribed load WX in Step S61, the controller 60 determines whether or not the duration of time TG that a state in which the rear wheel load WR that is applied to the rear wheel 14 is less than the prescribed load WX, is the seventh prescribed time TGX or more in Step S63. When the time TG is less than the seventh prescribed time TGX, the controller 60 ends the present process and executes the process of Step S61 again after a prescribed period. When the time TG is greater than or equal to the seventh prescribed time TGX, the controller 60 ends the present process after reducing the output of the motor 56 to less than the output that is calculated from the output map or the calculation program in Step S62, and executes the process of Step S61 again after a prescribed period.

The bicycle driving device 50 of the fifteenth embodiment exerts the following effects, in addition to the effects of the bicycle driving device 50 of the fourteenth embodiment.

(2) The controller 60 reduces the output of the motor 56 based on time TG is greater than or equal to a seventh prescribed time TGX. Accordingly, in the case that the rear wheel 14 is lifted up from the road surface and immediately thereafter lands on the road surface, it is possible to prevent the output of the motor 56 from being reduced.

Sixteenth Embodiment

Figure 26:
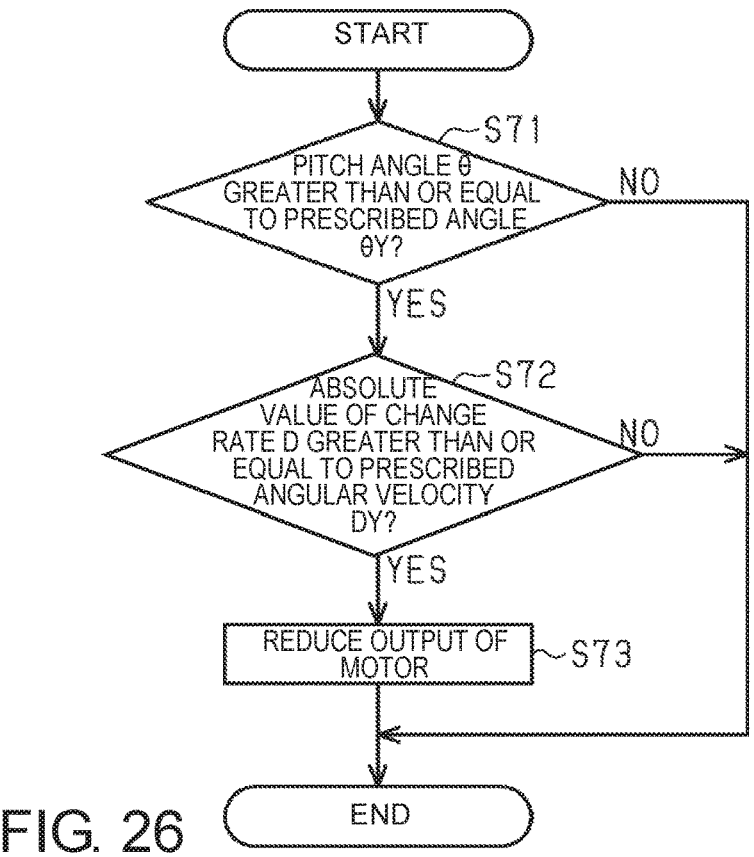
FIG. 26 is a flowchart of a torque control process executed by the controller of the bicycle driving device illustrated in FIG. 2 in accordance with a sixteenth embodiment.

The bicycle driving device 50 of the sixteenth embodiment will be described with reference to FIG. 2 and FIG. 26. The configurations that are common to the first embodiment are given the same reference numbers as the first embodiment, and the descriptions thereof will be omitted. The controller 60 shown in FIG. 2 programmed to calculate a change rate D of the pitch angle θ based on the output of the tilt sensor 68. The controller 60 reduces the output of the motor 56, which assists the manual drive force, based on the pitch angle θ of the bicycle body 16 of the bicycle 10 is less than or equal to a prescribed angle θY which is less than "zero" degrees in the torque control process, and, that the absolute value of the change rate D of the pitch angle θ is greater than or equal to a prescribed angular velocity DY, which is greater than "zero." Information regarding the prescribed angle θY is stored in the storage unit 62.

The torque control process which is executed by the controller 60 of the sixteenth embodiment will be described with reference to FIG. 26. The controller 60 determines whether or not the pitch angle θ is less than or equal to the prescribed angle θY in Step S71. When the pitch angle θ is greater than the prescribed angle θY, the controller 60 ends the present process and executes the process of Step S71 again after a prescribed period. When the pitch angle θ is less than or equal to the prescribed angle θY, the controller 60 determines whether or not the absolute value of the change rate D of the pitch angle θ is greater than or equal to the prescribed angular velocity DY in Step S72. When the absolute value of the change rate D of the pitch angle θ is less than the prescribed angular velocity DY, the controller 60 ends the present process and executes the process of Step S71 again after a prescribed period. When the absolute value of the change rate D of the pitch angle θ is greater than or equal to the prescribed angular velocity DY, the controller 60 ends the present process after reducing the output of the motor 56 to less than the output that is calculated from the output map or the calculation program in Step S73, and executes the process of Step S71 again after a prescribed period.

The action and effects of the bicycle driving device 50 of the sixteenth embodiment will be described.

(1) If the motor 56 is carrying out driving when the rear wheel 14 lands from an uplifted state, the torque of the motor 56 affects the behavior of the bicycle 10. When the pitch angle θ is less than or equal to the prescribed angle θY, the controller 60 reduces the output of the motor 56. That is, when the rear wheel 14 is lifted and the pitch angle θ becomes less than or equal to the prescribed angle θY, which is less than "zero." the controller 60 is capable of reducing the output of the motor 56. Accordingly, the stability of the behavior of the bicycle 10 when the rear wheel 14 is lifted can be improved.

(2) The controller 60 reduces the output of the motor 56 based on the change rate D of the pitch angle θ is less than the prescribed angular velocity DY, which is less than "zero." In other words, the controller 60 infers that an uplift of the rear wheel 14 has occurred when the pitch angle θ is abruptly reduced in a state of being less than "zero" degrees. Accordingly, compared to when comparing the output of the motor 56 based only on the size of the pitch angle θ, it is possible to suppress a reduction in the output of the motor 56 when the rear wheel 14 is not being lifted up.

Seventeenth Embodiment

The bicycle driving device 50 of the seventeenth embodiment will be described with reference to FIGS. 2 and 27. The configurations that are common to the sixteenth embodiment are given the same reference numbers as the sixteenth embodiment, and the descriptions thereof will be omitted. In the torque control process, the controller 60 shown in FIG. 2 reduces the output of the motor 56 which assists the manual drive force based on the duration of time TH that a state in which the pitch angle θ of the bicycle body 16 of the bicycle 10 is less than or equal to the prescribed angle θY, is an eighth prescribed time THX or more. Information regarding the prescribed time THX is stored in the storage unit 62.

The torque control process which is executed by the controller 60 of the seventeenth embodiment will be described with reference to FIG. 27. When the pitch angle θ is less than or equal to the prescribed angle θY in Step S71, the controller 60 determines whether or not the change rate D of the pitch angle θ is less than a prescribed angular velocity DY in Step S72. When the change rate D of the pitch angle θ is less than the prescribed angular velocity DY, the controller 60 determines whether or not the duration of time TH that a state in which the pitch angle θ is less than the prescribed angle θX, is greater than or equal to the eighth prescribed time THX, in Step S74. When the time TH is less than the eighth prescribed time THX, the controller 60 ends the present process and executes the process of Step S71 again after a prescribed period. When the time TH is greater than or equal to the eighth prescribed time THX, the controller 60 ends the present process after reducing the output of the motor 56 to less than the output that is calculated from the output map or the calculation program in Step S73, and executes the process of Step S71 again after a prescribed period.

The bicycle driving device 50 of the seventeenth embodiment exerts the following effects, in addition to the effects of the bicycle driving device 50 of the sixteenth embodiment.

(3) The controller 60 reduces the output of the motor 56 based on time TH is greater than or equal to an eighth prescribed time THX. Accordingly, in the case that the front wheel 12 or the rear wheel 14 is lifted up from the road surface and immediately thereafter lands on the road surface, it is possible to prevent the output of the motor 56 from being reduced.

Eighteenth Embodiment

Figure 28:
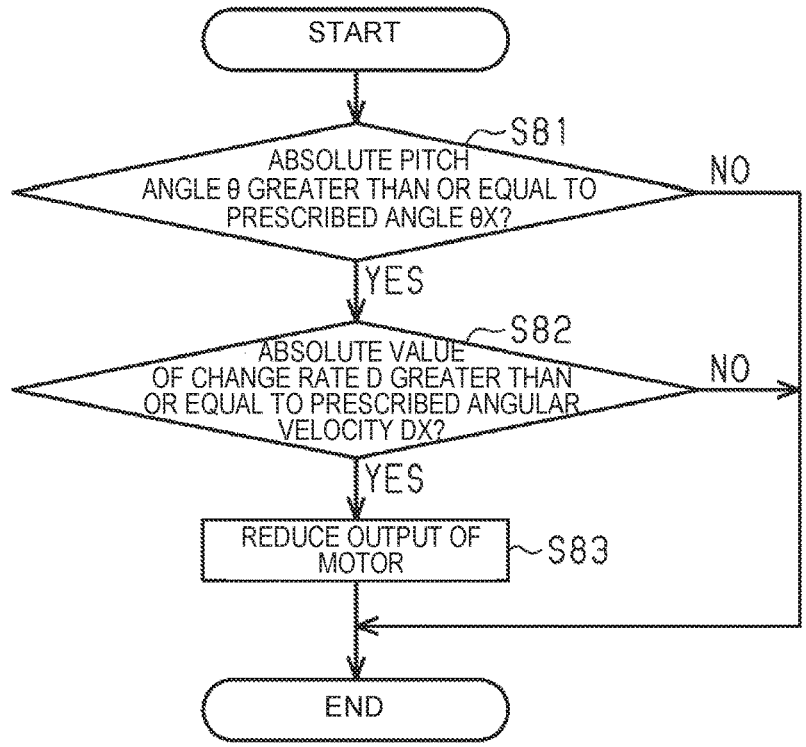
FIG. 28 is a flowchart of a torque control process executed by the controller of the bicycle driving device illustrated in FIG. 2 in accordance with an eighteenth embodiment.

The bicycle driving device 50 of the eighteenth embodiment will be described with reference to FIGS. 2 and 28. The configurations that are common to the first embodiment are given the same reference numbers as the first embodiment, and the descriptions thereof will be omitted. The controller 60 shown in FIG. 2 programmed to calculate the change rate D of the pitch angle θ based on the output of the tilt sensor 68. The controller 60 reduces the output of the motor 56, which assists the manual drive force, based on the absolute value of the pitch angle θ of the bicycle body 16 of the bicycle 10 is greater than or equal to a prescribed angle θX in the torque control process, and, that the absolute value of the change rate D of the pitch angle θ is greater than or equal to a prescribed angular velocity DX.

The torque control process which is executed by the controller 60 of the eighteenth embodiment will be described with reference to FIG. 28. The controller 60 determines whether or not the absolute value of the pitch angle θ is greater than or equal to a prescribed angle θX in Step S81. When the absolute value of the pitch angle θ is less than the prescribed angle θX, the controller 60 ends the present process and executes the process of Step S81 again after a prescribed period.

When the absolute value of the pitch angle θ is greater than or equal to the prescribed angle θX, the controller 60 determines whether or not the absolute value of the change rate D of the pitch angle θ is greater than or equal to the prescribed angular velocity DX in Step S82. When the absolute value of the change rate D of the pitch angle θ is less than the prescribed angular velocity DX, the controller 60 ends the present process and executes the process of Step S81 again after a prescribed period. When the absolute value of the change rate D of the pitch angle θ is greater than or equal to the prescribed angular velocity DX, the controller 60 ends the present process after reducing the output of the motor 56 to less than the output that is calculated from the output map or the calculation program in Step S83, and executes the process of Step S81 again after a prescribed period.

The action and effects of the bicycle driving device 50 will be described.

(1) When the absolute value of the pitch angle θ is greater than or equal to the prescribed angle θX, the controller 60 reduces the output of the motor 56. That is, when the front wheel 12 is lifted and the pitch angle θ becomes greater than or equal to a prescribed angle +θX, which is greater than "zero," and, when the rear wheel 14 is lifted and the pitch angle θ becomes less than a prescribed angle −θY, which is less than "zero," the controller 60 is capable of reducing the output of the motor 56. Accordingly, the stability of the behavior of the bicycle 10 both when the front wheel 12 is lifted, as well as when the rear wheel 14 is lifted, can be improved.

(2) The controller 60 reduces the output of the motor 56 based on the absolute value of the change rate D of the pitch angle θ is greater than or equal to a prescribed angular velocity DX. Accordingly, it is possible to suppress the output of the motor 56 from being reduced, when the front wheel 12 is not being lifted up, as well as when the rear wheel 14 is not being lifted up.

Modifications

The descriptions relating to each embodiment described above are examples of forms that the bicycle driving device 50 according to the present invention can take, and are not intended to limit the forms thereof. For example, the bicycle driving device 50 according to the present invention can, in addition to each of the embodiments described above, take forms of the modified example of each of the above-described embodiments shown below, as well as forms that combine at least two modified examples that are not mutually contradictory.

Figure 6:
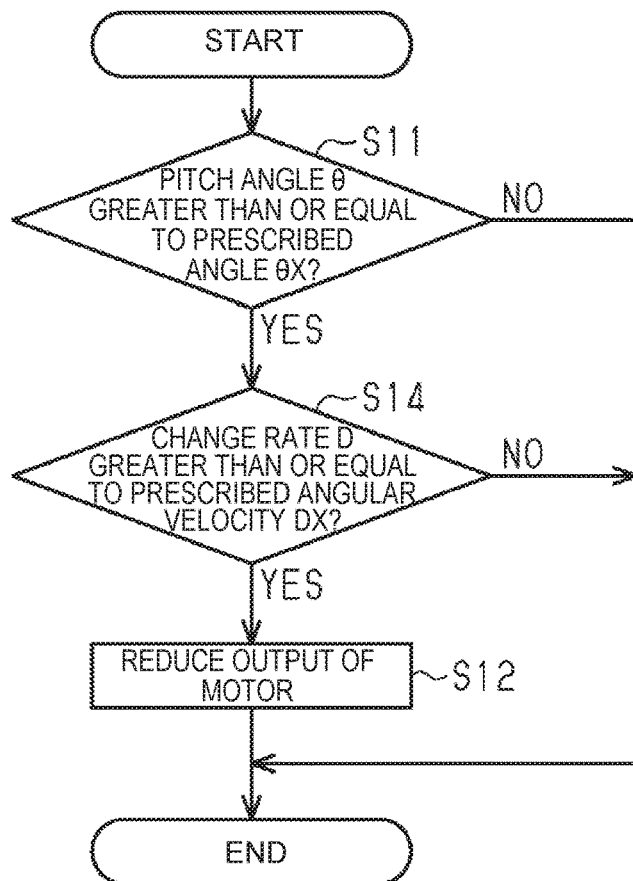
FIG. 6 is a flowchart of a torque control process executed by the controller of the bicycle driving device illustrated in FIG. 2 in accordance with a third embodiment.
Figure 27:
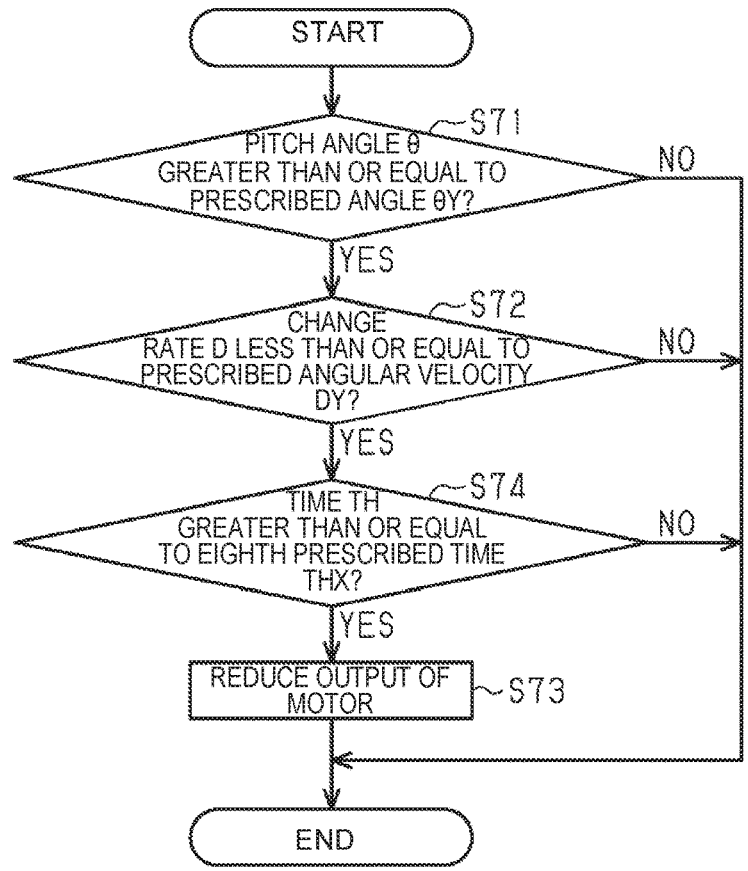
FIG. 27 is a flowchart of a torque control process executed by the controller of the bicycle driving device illustrated in FIG. 2 in accordance with a seventeenth embodiment.

For example, in the bicycle driving device 50 of the third embodiment, the torque control process shown in FIG. 6 and the torque control process shown in FIG. 27 can be carried out. In this case, the stability of the behavior of the bicycle 10 both when the front wheel 12 is lifted, as well as when the rear wheel 14 is lifted, can be improved.

Figure 29:
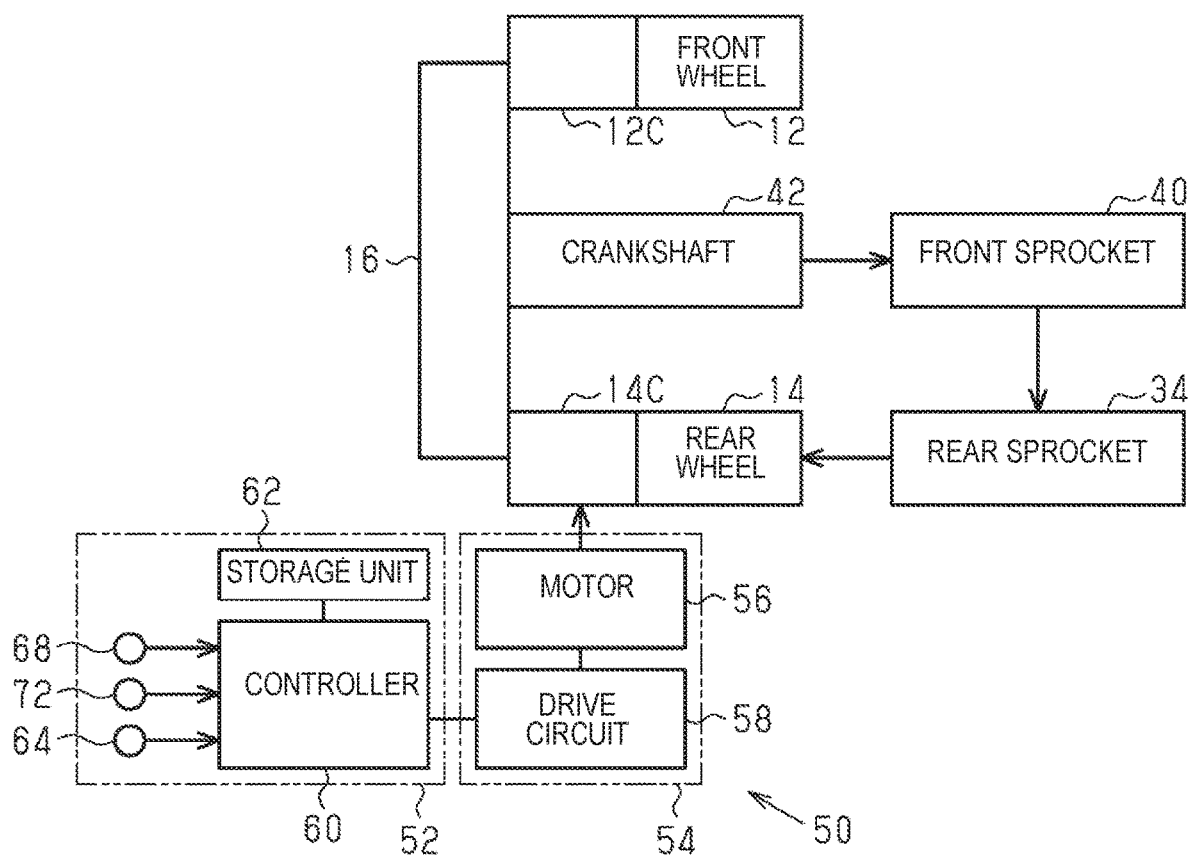
FIG. 29 is a block diagram of a bicycle driving device including a bicycle control apparatus having a controller according to a modified example.

In the first to the ninth as well as the eighteenth embodiments, the assist mechanism 54 can be provided to the rear wheel 14. For example, as shown in FIG. 29, the assist mechanism 54 is provided around a hub shaft of the hub 14C of the rear wheel 14. An output shaft of the motor 56 is connected directly, or via a decelerator (not shown), to a hub shell (not shown) of a hub 14C. Further, the motor 56 can be provided so as to apply a drive force to the rim or the tire of the rear wheel 14 via a roller (not shown). In the first to the ninth as well as the eighteenth embodiments, the motor 56 can be provided so as to apply a drive force to a chain 36, which is between the front sprocket 40 and the rear sprocket 34, via a sprocket (not shown). The rotation of the rear wheel 14 is assisted by the driving of the motor 56. In this case, the stability of the behavior of the bicycle 10 when the front wheel 12 is lifted can be improved.

In the first to the ninth as well as the eighteenth embodiments, for example, as shown in FIG. 17, the assist mechanism 54 can be provided to the front wheel 12. In this case, since the controller 60 reduces the output of the motor 56 when the front wheel 12 is lifted up off of the road or ground, it is possible to improve the stability of the behavior of the bicycle 10 when the front wheel 12 lands.

In the tenth to the fifteenth embodiments, for example, as shown in FIG. 10, the assist mechanism 54 can be provided so as to be capable of transmitting drive force to a drive path between the crankshaft 42 and the front sprocket 40. In this case, since the controller 60 reduces the output of the motor 56 when the rear wheel 14 is lifted up, it is possible to improve the stability of the behavior of the bicycle 10 when the rear wheel 14 lands.

In the sixteenth and the seventeenth embodiments, for example, as shown in FIG. 17, the assist mechanism 54 can be provided to the front wheel 12. In this case, since the controller 60 reduces the output of the motor 56 when the rear wheel 14 is lifted up, it is possible to improve the stability of the behavior of the bicycle 10 when the rear wheel 14 lands.

In the tenth to the seventeenth embodiments, as shown in FIG. 29, the assist mechanism 54 can be provided to the rear wheel 14. In this case, since the controller 60 reduces the output of the motor 56 when the rear wheel 14 is lifted up, it is possible to improve the stability of the behavior of the bicycle 10 in a state in which the rear wheel 14 is lifted up.

In the first to the ninth embodiments, it is also possible to reduce the output of the motor 56 when the rear wheel load WR is greater than a prescribed value. The rear wheel load WR is increased when the front wheel 12 is lifted up. Accordingly, an uplift of the front wheel 12 can be detected based on the rear wheel load WR being greater than a prescribed value. Meanwhile, it is also possible to reduce the output of the motor 56 when the rear load WB is greater than a prescribed value. Further, it is also possible to reduce the output of the motor 56 when the rear suspension 22C is compressed the most.

In the tenth to the fifteenth embodiments, it is also possible to reduce the output of the motor 56 when the front wheel load WF is greater than a prescribed value. The front wheel load WF is increased when the rear wheel 14 is lifted up. Accordingly, an uplift of the rear wheel 14 can be detected based on the front wheel load WF being greater than a prescribed value. Meanwhile, it is also possible to reduce the output of the motor 56 when the front load WA is greater than a prescribed value. Further, it is also possible to reduce the output of the motor 56 when the front suspension 24A is compressed the most.

In the first to the fifth as well as the sixteenth to the eighteenth embodiments, the tilt sensor 68 can be provided to a bicycle component such as a transmission.

In the first to the fifth as well as the sixteenth to the eighteenth embodiments, the bicycle driving device 50 can be mounted on a bicycle equipped with at least one of the front suspension and the rear suspension. In this case, when the front wheel 12 is lifted up off of the road or ground in a bicycle equipped with, for example, the front suspension, the pitch angle θ of the bicycle body 16 is increased after the front suspension is fully extended. Further, when the rear wheel 14 is lifted up off of the road or ground in a bicycle equipped with the rear suspension, the pitch angle θ of the bicycle body 16 is decreased after the rear suspension is fully extended. Accordingly, the prescribed angle θX can be made smaller than the prescribed angle θX of the first to the fifth as well as the eighteenth embodiments. Further, the prescribed angle θY can be made larger than the prescribed angle θY of the sixteenth and seventeenth embodiments.

At least one of the front suspension 24A and the rear suspension 22C of the sixth to the thirteenth embodiments can be changed to an air suspension or a spring suspension. In this case, a pressure sensor 78 of the ninth, the tenth, the twelfth, and the thirteenth embodiments can be changed to a sensor that detects the spring load.

In each of the embodiments, a parameter other than the manual drive force and the bicycle speed can be added to the output of the motor 56 and the calculation program. For example, the rotational speed of the crank 38, or the cadence can be used.

In each of the embodiments, the prescribed angles θX and θY as well as information regarding the prescribed times TAX, TBX, TCX, TDX, TEX, TFX, TGX, THX which are stored in the storage unit 62 can be overwritten or be set. Overwriting or setting of information stored in the storage unit 62 can be carried out by connecting an external computer to the bicycle driving device 50 by wire or wirelessly, or carried out using a display and an input unit provided to the bicycle 10.

The bicycle driving device 50 of each of the embodiments can be applied to various bicycles, such as a city cycle, a mountain bike, and a road bike.

The bicycle control apparatus 50 basically comprises the controller 60 for reducing an output of the motor 56 that assists a manual drive force, based on an absolute value of a pitch angle of a bicycle body is greater than or equal to a prescribed angle, and, that the absolute value of a change rate of the pitch angle is greater than or equal to a prescribed angular velocity.

The bicycle control apparatus 50 includes the controller 60, which is configured to reduce the output of the motor 56, based on a duration of time that a state existed for a ninth prescribed time or more in which the absolute value of the pitch angle has been greater than or equal to the prescribed angle.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same tune. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control apparatus comprising:
   a controller configured to control a motor that assists a manual drive force, based on a state of a suspension that absorbs vibrations of a bicycle, the state of the suspension being at least one of a stroke of the suspension and a load that is applied to the suspension; and
   a sensor that detects the state of the suspension.

2. The bicycle control apparatus as recited in claim 1, wherein
   the controller is configured to reduce the output of the motor when the state of the suspension is a prescribed state.

3. The bicycle control apparatus as recited in claim 2, wherein
   the suspension comprises at least a rear suspension, and
   the prescribed state includes a state in which the rear suspension is fully extended.

4. The bicycle control apparatus as recited in claim 2, wherein
   the suspension comprises at least a rear suspension, and
   the prescribed state includes a case where a duration of time that a state existed for a further prescribed time or more during which the rear suspension has been fully extended.

5. The bicycle control apparatus as recited in claim 2, wherein
   the suspension comprises at least a rear suspension, and
   the prescribed state includes a case where a load that is applied to the rear suspension is less than a prescribed load.

6. The bicycle control apparatus as recited in claim 2, wherein
   the suspension comprises at least a rear suspension, and
   the prescribed state includes a case where a duration of time that a state existed for another further prescribed time or more in which a load that is applied to the rear suspension has been less than a prescribed load.

7. The bicycle control apparatus as recited in claim 1, wherein
   the state of the suspension is a detected length of the suspension detected by the sensor.

8. A bicycle control apparatus comprising:
   a controller configured to control a motor that assists a manual drive force, based on a state of a suspension that absorbs vibrations of a bicycle, the controller is configured to reduce the output of the motor when the state of the suspension is a prescribed state,
   the prescribed state including a state in which the suspension is fully extended.

9. The bicycle control apparatus as recited in claim 8, wherein
   the prescribed state includes a case where a duration of time that a state existed for a prescribed time or more during which the suspension has been fully extended.

10. The bicycle control apparatus as recited in claim 8, further comprising
   a stroke sensor that outputs a signal corresponding to a detected length of the suspension.

11. The bicycle control apparatus as recited in claim 10, wherein
   the controller determines a state of the suspension by comparing the detected length of the suspension to a pre-stored maximum length of the suspension.

12. The bicycle control apparatus as recited in claim 8, wherein
   the suspension comprises at least one of a front suspension and a rear suspension.

13. A bicycle control apparatus comprising:
   a controller configured to control a motor that assists a manual drive force, based on a state of a suspension that absorbs vibrations of a bicycle, the controller is configured to reduce the output of the motor when the state of the suspension is a prescribed state, the prescribed state including a case where a load that is applied to the suspension is less than a prescribed load.

14. The bicycle control apparatus as recited in claim 13, wherein
   the prescribed state includes a case where a duration of time that a state existed for another prescribed time or more during which a load that is applied to the suspension has been less than a prescribed load.

15. The bicycle control apparatus as recited in claim 13, further comprising
   a pressure sensor that outputs a signal corresponding to a detected pressure of oil inside the suspension.

16. The bicycle control apparatus as recited in claim 13, wherein
   the suspension comprises at least one of a front suspension and a rear suspension.

* * * * *